US012058506B2

(12) United States Patent
Yu et al.

(10) Patent No.: US 12,058,506 B2
(45) Date of Patent: Aug. 6, 2024

(54) MOBILE TERMINAL

(71) Applicant: HUAWEI TECHNOLOGIES CO., LTD., Guangdong (CN)

(72) Inventors: Zhuojun Yu, Shanghai (CN); Chien Feng Yeh, Shenzhen (CN); Jun Ding, Dongguan (CN); Zhou Lin, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 107 days.

(21) Appl. No.: 17/640,490

(22) PCT Filed: Jul. 16, 2020

(86) PCT No.: PCT/CN2020/102243
§ 371 (c)(1),
(2) Date: Mar. 4, 2022

(87) PCT Pub. No.: WO2021/042877
PCT Pub. Date: Mar. 11, 2021

(65) Prior Publication Data

US 2022/0345827 A1 Oct. 27, 2022

(30) Foreign Application Priority Data

Sep. 6, 2019 (CN) ......................... 201910839727.1
Sep. 18, 2019 (CN) ......................... 201910883105.9

(51) Int. Cl.
*H04R 9/06* (2006.01)
*H04R 7/04* (2006.01)
(Continued)

(52) U.S. Cl.
CPC ................. *H04R 9/06* (2013.01); *H04R 7/04* (2013.01); *H04R 9/025* (2013.01); *H04R 11/02* (2013.01);
(Continued)

(58) Field of Classification Search
CPC .... H04R 9/025; H04R 9/027; H04R 2400/11; H04R 2499/11
See application file for complete search history.

(56) References Cited

U.S. PATENT DOCUMENTS

2014/0241564 A1 8/2014 Kang et al.
2016/0212546 A1* 7/2016 Salvatti .................... H04R 9/06
(Continued)

FOREIGN PATENT DOCUMENTS

CN 104753111 A 7/2015
CN 110049416 A 7/2019
(Continued)

OTHER PUBLICATIONS

Anonymous:"Halbach array Wikipedia" Nov. 25, 2016 (Nov. 25, 2016) XP055712574 Retrieved from th internet:URL:https://web .archive .org/web/20161125142135/https://en.wikipedia.org/wiki/ Halbacharray.

*Primary Examiner* — Suhan Ni
(74) *Attorney, Agent, or Firm* — WOMBLE BOND DICKINSON (US) LLP

(57) ABSTRACT

This application provides a mobile terminal including a first magnet and a second magnet. At least a part of the first magnet and at least a part of the second magnet are disposed in the accommodating space. The first magnet is disposed on a back facet of the display module, the second magnet is disposed on the middle frame, and positions of the first magnet and the second magnet are disposed opposite to each other. The first magnet is a coil, and the second magnet is a main magnet; or the first magnet is a main magnet, and the second magnet is a coil. The main magnet is a Halbach array, and the main magnet generates a unilateral magnetic field on a side opposite to the coil.

16 Claims, 18 Drawing Sheets

(51) Int. Cl.
*H04R 9/02* (2006.01)
*H04R 11/02* (2006.01)

(52) U.S. Cl.
CPC ...... *H04R 2400/11* (2013.01); *H04R 2499/11* (2013.01)

(56) References Cited

U.S. PATENT DOCUMENTS

| | | | | |
|---|---|---|---|---|
| 2019/0004566 | A1 | 1/2019 | Lee et al. | |
| 2019/0091725 | A1* | 3/2019 | Okayasu ................ | H04R 9/066 |

FOREIGN PATENT DOCUMENTS

| | | | |
|---|---|---|---|
| CN | 110087172 | A | 8/2019 |
| CN | 110113696 | A | 8/2019 |
| CN | 110166904 | A | 8/2019 |
| CN | 110177318 | A | 8/2019 |
| JP | 2007300578 | A | 11/2007 |

* cited by examiner

MOBILE TERMINAL

This application is a National Stage of International Application No. PCT/CN2020/102243, filed on Jul. 16, 2020, which claims priority to Chinese Patent Application No. 201910839727.1, filed on Sep. 6, 2019 and Chinese Patent Application No. 201910883105.9, filed on Sep. 18, 2019. All of the aforementioned applications are hereby incorporated by reference in their entireties.

TECHNICAL FIELD

This application relates to the field of terminal technologies, and in particular, to a mobile terminal.

BACKGROUND

With development of mobile terminal technologies, to obtain a larger screen-to-body ratio, increasing mobile terminals cancel sound outlet holes disposed on the front of screens, and transmit sound by using a sound on display technology.

A principle of the sound on display technology is as follows: A screen is driven by using a vibration sounding module inside a mobile terminal, the screen is used as a vibration body, and sound waves are generated through screen vibration and transmitted to human ears. In this way, the mobile terminal can cancel a design of a receiver.

In existing sound on display solutions, a problem of an insufficient push force of the vibration sounding module generally exists, resulting in low sound generated by the screen and a poor sound on display effect.

SUMMARY

This application provides a mobile terminal, so that when a mobile terminal uses a screen to generate sound, high sound is generated through screen vibration, thereby improving a sound on display effect.

A first aspect provides a mobile terminal, including a middle frame, and a housing and a display module that are disposed on both sides of the middle frame. The display module is connected to the middle frame, and accommodating space is formed between the display module and the middle frame. The mobile terminal further includes a first magnet and a second magnet, and at least a part of the first magnet and at least a part of the second magnet are disposed in the accommodating space. The first magnet is disposed on a back facet of the display module, the second magnet is disposed on the middle frame, and positions of the first magnet and the second magnet are disposed opposite to each other. The first magnet is a coil, and the second magnet is a main magnet; or the first magnet is a main magnet, and the second magnet is a coil. The main magnet is a Halbach array, and the main magnet generates a unilateral magnetic field on a side opposite to the coil.

It should be understood that the coil in an embodiment of this application is a coil that can generate a magnetic field. For example, if a coil can generate a magnetic field after a current is applied to the coil, the coil may be used as a magnet.

In an embodiment of this application, there is an interaction force between a magnetic field generated by the first magnet and a magnetic field generated by the second magnet. Under the action of the magnetic field generated by the first magnet and the magnetic field generated by the second magnet, the first magnet may vibrate in a direction perpendicular to a light-emitting surface of the display module. Because the first magnet is disposed on the back facet of the display module, the first magnet drives the display module to move up and down at a small amplitude and a high frequency relative to the middle frame. Driven by the first magnet, the display module, as a diaphragm, pushes air to generate sound in a vibration process, to implement sound on display, thereby implementing a function of a receiver or a horn. Because power of driving the display module to vibrate comes from an acting force between the magnetic field generated by the first magnet and the magnetic field generated by the second magnet, the acting force easily causes the display module to vibrate at a large amplitude, so that high sound is generated, and a sound on display effect is improved.

The coil may receive a first drive signal, and generate a magnetic field with variable strength and a variable direction based on the first drive signal. The magnetic field generated by the coil interacts with a magnetic field generated by the main magnet, to implement sound on display. In an embodiment, when the first magnet is the coil, in a process of implementing sound on display, the coil drives the display module as a diaphragm, to push air to generate sound in a vibration process. Alternatively, when the first magnet is the main magnet, in a process of implementing sound on display, the main magnet drives the display module as a diaphragm, to push air to generate sound in a vibration process.

The Halbach array can generate a unilateral magnetic field. Because the main magnet uses the Halbach array, magnetic field strength on a side that is of the main magnet and that is close to the coil is significantly improved, and magnetic field strength on the other side is significantly reduced. In this way, when the magnetic field generated by the coil interacts with the magnetic field generated by the main magnet after the coil is powered on, magnetic forces exerted on the main magnet and the coil are significantly increased, so that vibration intensity of the coil or vibration intensity of the main magnet can be improved, thereby improving vibration intensity of the display module, increasing sound generated by a screen, and improving a sound on display effect.

In addition, because the main magnet uses the Halbach array, a magnetic field strength on one side of the array can be significantly improved. While the same performance is achieved (for example, the main magnet has same vibration intensity), the main magnet 2210 may be thinner, or a quantity of turns of the coil may be smaller, so that thickness space for mounting the main magnet and the coil can be reduced, thereby reducing a thickness of the mobile terminal.

In addition, no sound outlet hole needs to be disposed in the mobile terminal, to resolve a problem that sound quality is affected by blockage of a sound outlet hole. In addition, a hole opening process in the mobile terminal is reduced, so that a surface of a display side of the mobile terminal is more flat and rounded.

In an embodiment, a part of the main magnet is embedded in a closed region wound by a wire of the coil.

In this case, in the process of implementing sound on display, after the coil receives the first drive signal, when the first magnet is the coil, a magnetic field generated by the coil interacts with a magnetic field generated by the main magnet, so that the coil drives the display module to vibrate up and down in a magnetic line cutting manner at a small amplitude and a high frequency. Alternatively, when the first magnet is the main magnet, the main magnet is reacted by the coil, and the coil drives the display module to vibrate at a high frequency.

In an embodiment, the mobile terminal further includes at least one auxiliary magnet; the auxiliary magnet and the main magnet are located on a same side, and there is a gap between the auxiliary magnet and the main magnet; and a part of the coil is located in the gap between the auxiliary magnet and the main magnet.

It should be understood that in this embodiment of this application, that the auxiliary magnet and the main magnet are located on a same side may mean that the auxiliary magnet and the main magnet are located on a same component. The component may be the display module, the middle frame, a magnetic bowl, a magnetic shield, a support, or the like. For example, when the first magnet is the main magnet, the auxiliary magnet is also disposed on the back facet of the display module; or when the second magnet is the main magnet, the auxiliary magnet is also disposed on the middle frame.

In this way, the magnetic field generated by the coil can not only interact with the magnetic field generated by the main magnet, but also interact with a magnetic field generated by the at least one auxiliary magnet, to improve vibration intensity of the coil or vibration intensity of the main magnet.

In an embodiment, the mobile terminal further includes a washer; and when the first magnet is the main magnet, the washer is located on a surface of a side that is of the main magnet and that is away from the display module; or when the second magnet is the main magnet, the washer is located on a surface of a side that is of the main magnet and that is away from the middle frame.

The washer is made of low-carbon steel. The washer has a magnetic conductive function, to reduce magnetic resistance of the main magnet, and the washer also has a magnetic shielding function.

In an embodiment, the mobile terminal further includes a magnetic bowl used to carry the main magnet; and when the second magnet is the main magnet, the magnetic bowl is located on a surface of a side that is of the main magnet and that is away from the display module.

In this case, the magnetic bowl may have a magnetic shielding function, to reduce a probability that a magnetic field generated by the main magnet has adverse impact on another device in the mobile terminal.

In an embodiment, the main magnet is located outside a closed region wound by a wire of the coil; and opposite surfaces of the main magnet and the coil are parallel.

In this case, in the process of implementing sound on display, when the coil receives the first drive signal, under interaction between the magnetic field generated by the coil and the magnetic field generated by the main magnet, the coil and the main magnet can attract or repel each other, so that the first magnet (the coil or the main magnet) vibrates at a small amplitude and a high frequency relative to the second magnet (the main magnet or the coil). In this way, the first magnet drives the display module to vibrate at a small amplitude and a high frequency, to implement the sound on display.

In an embodiment, the mobile terminal further includes one auxiliary magnet; and the auxiliary magnet and the coil are located on a same side, and the auxiliary magnet is embedded in the closed region wound by the wire of the coil.

It should be understood that in this embodiment of this application, that the auxiliary magnet and the coil are located on a same side may mean that the auxiliary magnet and the coil are located on a same component. The component may be the display module, the middle frame, a magnetic bowl, a magnetic shield, a support, or the like. For example, when the first magnet is the coil, the auxiliary magnet is also disposed on the back facet of the display module; or when the second magnet is the coil, the auxiliary magnet is also disposed on the middle frame.

In this way, the magnetic field generated by the coil can not only interact with the magnetic field generated by the main magnet, but also interact with a magnetic field generated by the at least one auxiliary magnet, to improve vibration intensity of the coil or vibration intensity of the main magnet.

In an embodiment, opposite sides of the auxiliary magnet and the main magnet are a same magnetic pole.

In an embodiment, an end that is of the main magnet and that is close to the auxiliary magnet is set to an N pole, and an end that is of the main magnet and that is away from the auxiliary magnet is set to an S pole, and correspondingly, an end that is of the auxiliary magnet and that is close to the main magnet is set to an N pole, and an end that is of the auxiliary magnet and that is away from the main magnet is set to an S pole. Alternatively, an end that is of the main magnet and that is close to the auxiliary magnet is set to an S pole, and an end that is of the main magnet and that is away from the auxiliary magnet is set to an N pole, and correspondingly, an end that is of the auxiliary magnet and that is close to the main magnet is set to an S pole, and an end that is of the auxiliary magnet and that is away from the main magnet is set to an N pole.

The magnetic field generated by the main magnet interacts with a magnetic field generated by the auxiliary magnet, and opposite ends of the main magnet and the auxiliary magnet are set to a same pole, so that when the coil is not powered on, a repulsive force is kept between the main magnet and the auxiliary magnet, and connection reliability between the first magnet and the display module is improved, thereby avoiding the following problem: When opposite ends of the main magnet and the auxiliary magnet are set to different poles or no auxiliary magnet is disposed, there is an attraction force between the first magnet and the second magnet, and consequently, the display module is pulled by the first magnet and is deformed, and the first magnet is separated from the display module.

In an embodiment, the mobile terminal further includes a magnetic conductive plate; and when the first magnet is the main magnet, the magnetic conductive plate is located on a surface of a side that is of the main magnet and that is away from the display module, or is located on a surface of a side that is of the auxiliary magnet and that is away from the middle frame; or when the second magnet is the main magnet, the magnetic conductive plate is located on a surface of a side that is of the main magnet and that is away from the middle frame, or is located on a surface of a side that is of the auxiliary magnet and that is away from the display module.

The magnetic conductive plate is mainly used for magnetic conduction, so that a magnetic force is more centralized. Disposing the magnetic conductive plate can increase magnetic flux passing through the coil, to improve an acting force between the coil and the main magnet and improve vibration intensity of the main magnet or vibration intensity of the coil.

In an embodiment, the mobile terminal further includes a second magnetic shield; and the coil is located in the second magnetic shield, and for the coil, all surfaces other than at least a surface of a side facing the main magnet are wrapped by the second magnetic shield.

The second magnetic shield can reduce a probability that the magnetic field generated by the coil adversely affects another component in the mobile terminal.

In an embodiment, the mobile terminal does not include a first magnetic shield disposed around the main magnet.

A magnetic field generated by the Halbach array is a unilateral magnetic field, magnetic field strength on one side of the array is significantly improved, and magnetic field strength on the other side of the array is significantly reduced. In this case, the magnetic field generated by the main magnet causes quite small interference to a peripheral component, and no magnetic shield needs to be disposed on a main magnet side, so that thickness space required for mounting the main magnet can be reduced, thereby reducing a thickness of the mobile terminal.

In addition, due to the space saved by omitting a magnetic shield, a larger magnet space may be further obtained, for example, sizes or a size of the main magnet and/or the auxiliary magnet are or is increased, or a quantity of turns of the coil is increased, so that interaction between the magnetic field generated by the main magnet and the magnetic field generated by the coil is further improved, and vibration intensity of the main magnet is improved.

In an embodiment, the mobile terminal further includes a first magnetic shield; and the main magnet is located in the first magnetic shield, and for the main magnet, all surfaces other than a surface of a side facing the coil are wrapped by the first magnetic shield.

The first magnetic shield can reduce a probability that the magnetic field generated by the main magnet adversely affects another component in the mobile terminal.

In addition, when the first magnetic shield, the second magnetic shield, and the auxiliary magnet on a same side as the coil are all disposed together, opposite sides of the auxiliary magnet and the main magnet are a same magnetic pole. In this case, when the coil is not powered on, the first magnetic shield and the second magnetic shield are respectively magnetized by the main magnet and the auxiliary magnet and are magnetic. For the main magnet, the main magnet may be in a balanced state and hardly stressed under combined action of the magnetic field generated by the auxiliary magnet and a magnetic field generated by the second magnetic shield. Similarly, the auxiliary magnet, the first magnetic shield, and the second magnetic shield may be in a balanced state and hardly stressed under combined action of magnetic fields. In this way, the display module can also be balanced, and connection reliability between the first magnet and the display module can be improved, thereby avoiding the following problem: When opposite ends of the main magnet and the auxiliary magnet are set to different poles or no auxiliary magnet is disposed, there is an attraction force between the first magnet and the second magnet, and consequently, the display module is pulled by the first magnet and is deformed, for example, the display module is concave downward, and the first magnet is separated from the display module.

In an embodiment, when the mobile terminal includes the auxiliary magnet, the auxiliary magnet is located in the second magnetic shield, and opposite surfaces of the coil and the auxiliary magnet are not covered by the second magnetic shield.

The second magnetic shield can further reduce a probability that a magnetic field generated by the auxiliary magnet has adverse impact on another device in the mobile terminal.

In an embodiment, the main magnet includes a first main magnet part and a second main magnet part, and the second main magnet part is annular and is nested on the first main magnet part; and a magnetic pole direction of the second main magnet part is perpendicular to a magnetic pole direction of the first main magnet part.

In an embodiment, the first main magnet part is circular, and the second main magnet part is annular.

In an embodiment, when the first magnet is the main magnet, an end that is of the first main magnet part and that is away from the display module is set to an N pole, and an end that is of the first main magnet part and that is close to the display module is set to an S pole; and an end that is of the second main magnet part and that is close to the first main magnet part is set to an N pole, and an end that is of the second main magnet part and that is away from the first main magnet part is set to an S pole.

As the first magnet, the main magnet disposed in this way can generate a strong magnetic field on a side close to the coil, and generate a weak magnetic field on a side close to the display module.

In an embodiment, when the second magnet is the main magnet, an end that is of the first main magnet part and that is close to the display module is set to an N pole, and an end that is of the first main magnet part and that is away from the display module is set to an S pole; and an end that is of the second main magnet part and that is close to the first main magnet part is set to an N pole, and an end that is of the second main magnet part and that is away from the first main magnet part is set to an S pole.

As the second magnet, the main magnet disposed in this way can generate a strong magnetic field on a side close to the coil, and generate a weak magnetic field on a side close to the middle frame.

In an embodiment, the mobile terminal further includes a support; the support is disposed on a surface of a side that is of the middle frame and that is away from the display module, and is connected to the middle frame; a hole is disposed on the middle frame; at least a part of the second magnet is located in the hole on the middle frame; and the second magnet passes through the hole on the middle frame, and is disposed on the support.

In this way, a spacing between the first magnet and the second magnet can be increased, to help increase vibration space of the first magnet and the second magnet.

In an embodiment, the mobile terminal further includes a spring plate and a support block; the spring plate and the support block are located in the hole on the middle frame; the spring plate is located between the second magnet and the support, and the spring plate is connected to the second magnet; and the support block is disposed between the spring plate and the support, and an upper surface and a lower surface of the support block are respectively connected to the spring plate and the support.

A resonance frequency of a sound system including the first magnet, the display module, a foam adhesive, and the like is far greater than a resonance frequency of a vibration system including the spring plate. Therefore, the spring plate can work as a frequency divider. When the coil receives an intermediate-frequency or high-frequency first drive signal, the first magnet drives the display module to vibrate, so that the sound system works, to implement sound on display. When the coil receives a low-frequency second drive signal, the second magnet drives the spring plate and the middle frame connected to the spring plate to vibrate, so that the vibration system works, to implement vibration of the entire mobile terminal.

It should be understood that, that the spring plate is connected to the second magnet includes that the spring plate is directly connected or indirectly connected to the second magnet.

When the mobile terminal includes the magnetic bowl, that the spring plate is connected to the second magnet should mean that the spring plate is connected to the second magnet by using the magnetic bowl, in other words, the second magnet is carried in the magnetic bowl, and the spring plate is connected to the magnetic bowl.

When the mobile terminal includes the first magnetic shield or the second magnetic shield, that the spring plate is connected to the second magnet should mean that the spring plate is connected to the second magnet by using the first magnetic shield or the second magnetic shield, in other words, the second magnet is wrapped in the first magnetic shield or the second magnetic shield, and the spring plate is connected to the first magnetic shield or the second magnetic shield.

In an embodiment, the mobile terminal further includes a spring plate and a support block; the spring plate, the support block, the first magnet, and the second magnet are all located in the accommodating space; the spring plate is located between the second magnet and the middle frame, and the spring plate is connected to the second magnet; and the support block is disposed between the spring plate and the middle frame, and an upper surface and a lower surface of the support block are respectively connected to the spring plate and the middle frame.

When a gap between the display module and the middle frame is large enough, components such as the first magnet, the second magnet, and the spring plate may all be disposed in the accommodating space formed between the display module and the middle frame. A technical effect of the spring plate is the same as that described above. Details are not described herein again.

In an embodiment, the mobile terminal further includes a support plate; an upper surface of the support plate is connected to the display module; a lower surface of the support plate is connected to the first magnet; and an area of the upper surface of the support plate is larger than an area of a surface of a side that is of the first magnet and that is close to the support plate.

In this way, because the support plate is of a sheet structure, a contact area between the support plate and the display module is large. Therefore, the upper surface and the lower surface of the support plate are respectively in contact with the display module and the first magnet, so that a contact area between the first magnet and the display module can be increased, and a driving force provided for the display module can be applied to the display module more evenly in a vibration process of the first magnet. In addition, based on the support plate, a deformed area of the display module may be further expanded, so that vibration efficiency of the display module driven by the first magnet is increased, power consumption is reduced, and a sound on display effect is improved.

In an embodiment, when the mobile terminal includes the first magnetic shield or the second magnetic shield, that the lower surface of the support plate is connected to the first magnet should mean that the lower surface of the support plate is connected to the first magnet by using the first magnetic shield or the second magnetic shield. In other words, the first magnet is wrapped in the first magnetic shield or the second magnetic shield, and the lower surface of the support plate is connected to an upper surface of the first magnetic shield or the second magnetic shield.

A second aspect provides a vibration module, including a first magnet and a second magnet. Positions of the first magnet and the second magnet are disposed opposite to each other. The first magnet is a coil, and the second magnet is a main magnet; or the first magnet is a main magnet, and the second magnet is a coil. The main magnet is a Halbach array, and the main magnet generates a unilateral magnetic field on a side opposite to the coil.

In the vibration module provided in this embodiment of this application, there is an interaction force between a magnetic field generated by the first magnet and a magnetic field generated by the second magnet. Under action of the magnetic field generated by the first magnet and the magnetic field generated by the second magnet, the first magnet or the second magnet may move up and down at a small amplitude and a high frequency. When being applied to a terminal, the vibration module may drive a component on the terminal to move. The driven component may be used as a diaphragm to push air to generate sound in a vibration process, to implement sound generation, thereby implementing a function of a receiver or a horn.

The Halbach array can generate a unilateral magnetic field. Because the main magnet uses the Halbach array, magnetic field strength on a side that is of the main magnet and that is close to the coil is significantly improved, and magnetic field strength on the other side is significantly reduced. In this way, when a magnetic field generated by the coil interacts with the magnetic field generated by the main magnet after the coil is powered on, magnetic forces exerted on the main magnet and the coil are significantly increased, so that vibration intensity of the coil or vibration intensity of the main magnet can be improved.

In an embodiment, a part of the main magnet is embedded in a closed region wound by a wire of the coil.

In an embodiment, the vibration module includes at least one auxiliary magnet; the auxiliary magnet and the main magnet are located on a same side, and there is a gap between the auxiliary magnet and the main magnet; and a part of the coil is located in the gap between the auxiliary magnet and the main magnet.

In an embodiment, the vibration module further includes a magnetic bowl used to carry the main magnet.

In an embodiment, the main magnet is located outside a closed region wound by a wire of the coil; and opposite surfaces of the main magnet and the coil are parallel.

In an embodiment, the vibration module further includes one auxiliary magnet; and the auxiliary magnet and the coil are located on a same side, and the auxiliary magnet is embedded in the closed region wound by the wire of the coil.

In an embodiment, opposite sides of the auxiliary magnet and the main magnet are a same magnetic pole.

In an embodiment, the vibration module further includes a second magnetic shield; and the coil is located in the second magnetic shield, and for the coil, all surfaces other than at least a surface of a side facing the main magnet are wrapped by the second magnetic shield.

In an embodiment, the vibration module further includes a first magnetic shield; and the main magnet is located in the first magnetic shield, and for the main magnet, all surfaces other than a surface of a side facing the coil are wrapped by the first magnetic shield.

In an embodiment, the main magnet includes a first main magnet part and a second main magnet part, and the second main magnet part is annular and is nested on the first main magnet part; and a magnetic pole direction of the second main magnet part is perpendicular to a magnetic pole direction of the first main magnet part.

REFERENCE NUMERALS

Figure 1:
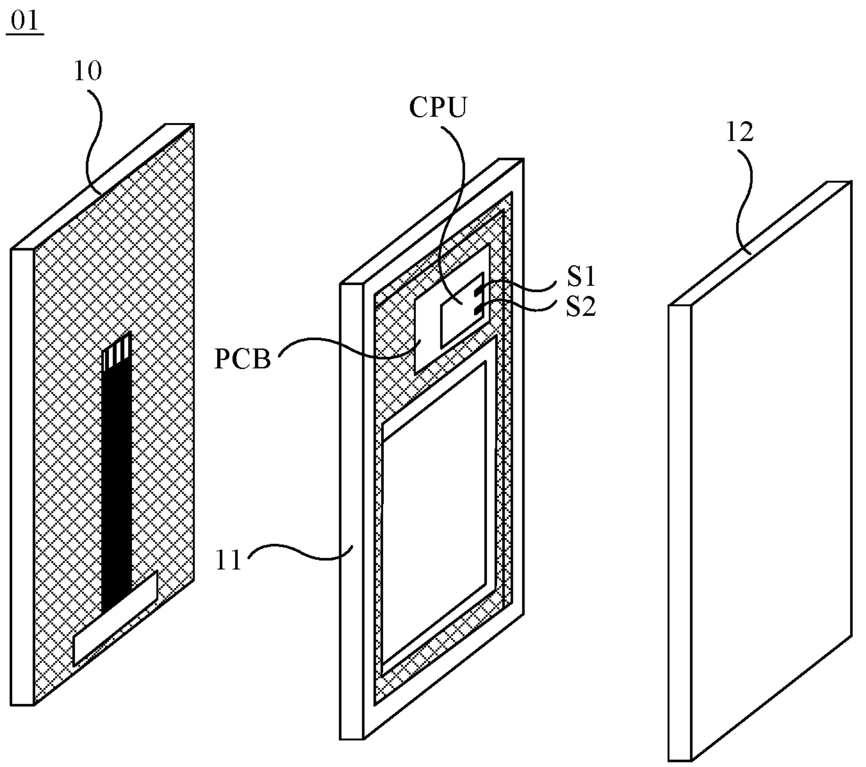
FIG. 1 is a schematic diagram of a structure of a mobile terminal according to an embodiment of this application.

01: a mobile terminal; 10: a display module; 101: a display panel; 102: a back light unit; 103: a cover; 11: a middle frame; 110: a bearing table; 111: a foam adhesive; 12: a housing; 20: accommodating space; 21: a first magnet; 22: a second magnet; 201: an actuator; 211: a coil; 212: a support plate; 213: a dome; 202: an elastic element; 2210: a main magnet; 2211: an auxiliary magnet; 2212: a magnetic conductive plate; 222: a spring plate; 223: a support; 224: a support block; 225: a washer; 226: a magnetic bowl; 30: a filter; 40: a first power amplifier; 41: a second power amplifier; 51: a first magnetic shield; 52: a second magnetic shield; 60: a groove; and 70: a diaphragm ring.

DESCRIPTION OF EMBODIMENTS

The following describes technical solutions of this application with reference to accompanying drawings. It is clear that the described embodiments are merely some but not all of the embodiments of this application.

The following terms such as "first" and "second" are merely intended for a purpose of description, and shall not be understood as an indication or implication of relative importance or implicit indication of a quantity of indicated technical features. Therefore, a feature limited by "first", "second", or the like may explicitly or implicitly include one or more features.

In addition, in this application, directional terms such as "center", "top", "bottom", "inside", and "outside" are defined relative to directions or positions of components schematically placed in the accompanying drawings. It should be understood that these directional terms are relative concepts and are used for relative description and clarification, and are not used to indicate or imply that an indicated apparatus or component needs to have a specified direction or be constructed and operated in a specified direction. The terms may change accordingly with directions in which components in the accompanying drawings are placed, and therefore cannot be construed as a limitation of this application.

It should be further noted that in the embodiments of this application, a same reference numeral indicates a same component or a same part. For same parts in the embodiments of this application, only one part or component marked with a reference numeral may be used as an example in the figure. It should be understood that the reference numeral is also applicable to another same part or component.

With continuous development of terminal technologies, functions of mobile terminals also tend to be diversified, and users also have an increasingly high requirement on sizes of screens. To pursue a higher screen-to-body ratio to provide better user experience for users, increasing mobile terminals cancel sound outlet holes disposed on the front of screens, and use a sound on display technology to replace conventional receivers.

A principle of the sound on display technology is as follows: A screen is used to replace a diaphragm in a conventional speaker, the screen is driven by using a vibration sounding module inside a mobile terminal, the screen is used as a vibration body, and sound waves are generated through screen vibration and transmitted to human ears.

Existing sound on display technologies mainly drive, by using an exciter or a piezoelectric ceramic, a screen to vibrate. The following briefly describes the two sound on display technologies.

A principle of the sound on display technology that drives the screen by using the exciter is the same as a sound generation principle of a conventional speaker. To be specific, a force field is generated through interaction of an electric field and a magnetic field. The exciter includes a coil and a magnet. Currents of different magnitudes and directions may be applied to the coil. In a constant magnetic field that has constant strength and a constant direction and that is generated by the magnet, because strength and a direction of a magnetic field generated by the coil constantly change with a current signal, interaction between the magnetic field generated by the coil and the magnetic field generated by the magnet causes the coil to move in a direction perpendicular to a current direction of the coil, so that vibration is generated. Because forces come in pairs, during application, a solution in which the magnet is fastened and the coil pushes the screen to vibrate may be used, or a solution in which the coil is fastened and the magnet pushes the screen to vibrate may be used. In this sound on display technology, the exciter may be fastened to a middle frame, and vibration is transmitted to the screen by using the middle frame. However, because an entire-system weight is much larger than a weight of the exciter, a vibration force finally transmitted to the screen is insufficient, and sound generated by the screen is low. Alternatively, the exciter may be directly fastened to the screen, so that vibration is directly transmitted to the screen. However, a reliability problem occurs although the sound can be subjectively increased, because a flexible printed circuit (flexible printed circuit, FPC) connected to the coil in the exciter is usually fastened to a middle frame, the exciter is fastened to the screen, the flexible printed circuit is pulled when the exciter vibrates together with the screen, and reliability is low. In addition, when a current is applied to the coil, the coil generates heat, and the heat of the coil is transferred to the screen, resulting in local overheating and local gray and dark problems of the screen.

In the sound on display technology that drives the screen by using the piezoelectric ceramic, vibration is mainly generated by using piezoelectricity of the piezoelectric ceramic. Under action of an applied electric field, centers of positive charges and negative charges inside the piezoelectric ceramic are displaced relative to each other, and the piezoelectric ceramic is polarized, causing bound charges with opposite symbols on surfaces of two ends of a dielectric. The displacement causes mechanical deformation of the dielectric. Therefore, piezoelectric deformation occurs after a current is applied to two layers of piezoelectric ceramics, and repeated deformation occurs after an alternating current is applied to the two layers of piezoelectric ceramics, so that vibration is generated. In this sound on display technology, because of a brittle attribute of the ceramic, a vibration amplitude of a piezoelectric ceramic plate cannot be extremely large; otherwise, the piezoelectric ceramic plate is easy to break. A small vibration amplitude of the piezoelectric ceramic plate causes an insufficient vibration force to be transmitted to the screen. Consequently, sound generated by the screen is low. In addition, in a solution, the piezoelectric ceramic plate may be fastened to a middle frame (similar to a cantilever beam), and the piezoelectric ceramic plate vibrates to shake the middle frame, to generate a sound effect similar to that of a receiver. This cantilever beam structure is fastened to the middle frame to generate vibration. The middle frame not only transmits vibration to the screen to make the screen vibrate and become a sound source, but also transmits the vibration to a back cover and the like of the mobile terminal to make a back facet of the mobile terminal vibrate and become another sound source, leading to sound leakage. Consequently, user privacy experience is poor.

In conclusion, vibration sounding modules used in the existing sound on display technologies have problems of low sound generated by the screen and a poor sound on display effect that are caused by an insufficient driving force for the screen. The embodiments of this application provide a mobile terminal, to resolve a problem of low sound generated by a screen, thereby improving a sound on display effect and user experience.

An embodiment of this application provides a mobile terminal 01 shown in FIG. 1. The mobile terminal 01 includes, for example, a mobile phone (such as a cellular phone or a smartphone), a tablet computer, a laptop computer, a personal digital assistant (PDA), a vehicle-mounted computer, a smart watch, or a smart wristband. A specific form of the mobile terminal 01 is not specially limited in this embodiment of this application. For ease of description, descriptions are provided below by using an example in which the mobile terminal 01 is a mobile phone.

As shown in FIG. 1, the mobile terminal 01 mainly includes a display module 10, a middle frame 11, and a housing 12. The display module 10 and the housing 12 are separately disposed on both sides of the middle frame 11. The mobile terminal 01 further includes a central processing unit (CPU) disposed on a printed circuit board (PCB).

Figure 2:
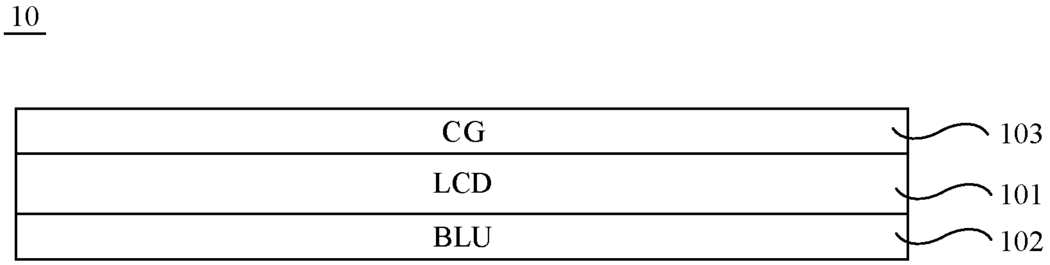
FIG. 2 is a schematic diagram of a structure of a display module in FIG. 1.

As shown in FIG. 2, the display module 10 includes a display panel (DP) 101.

In some embodiments of this application, the display panel 101 may be a liquid crystal display (LCD). In this case, the display module 10 further includes a back light unit (BLU) 102 configured to provide a light source for the liquid crystal display.

Figure 3:
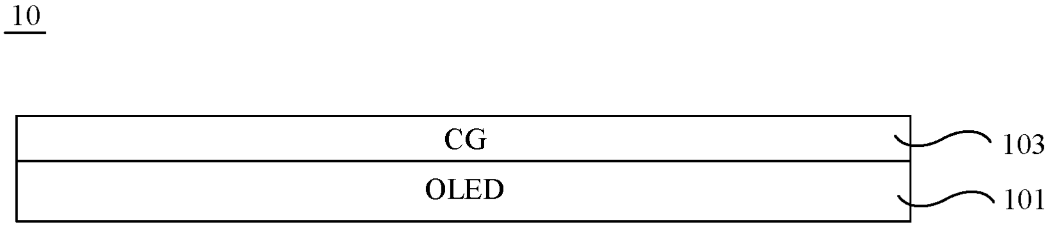
FIG. 3 is a schematic diagram of another structure of the display module in FIG. 1.

Alternatively, in some other embodiments of this application, as shown in FIG. 3, the display panel 101 is an organic light emitting diode (OLED) display, and the OLED display can implement self-luminescence. Therefore, no BLU needs to be disposed in the display module 10.

It should be noted that a substrate in the OLED display may be made of a flexible resin material. In this case, the OLED display is a flexible display.

Alternatively, the substrate in the OLED display may be made of a hard-textured material, such as glass. In this case, the OLED display is a hard display.

In some embodiments of this application, as shown in FIG. 2 or FIG. 3, the display module 10 further includes a cover 103 located on a display side of the display panel 101, for example, a cover glass (CG). The cover glass has specific toughness.

In addition, as shown in FIG. 1, the middle frame 11 is located between the display module 10 and the housing 12.

Figure 4:
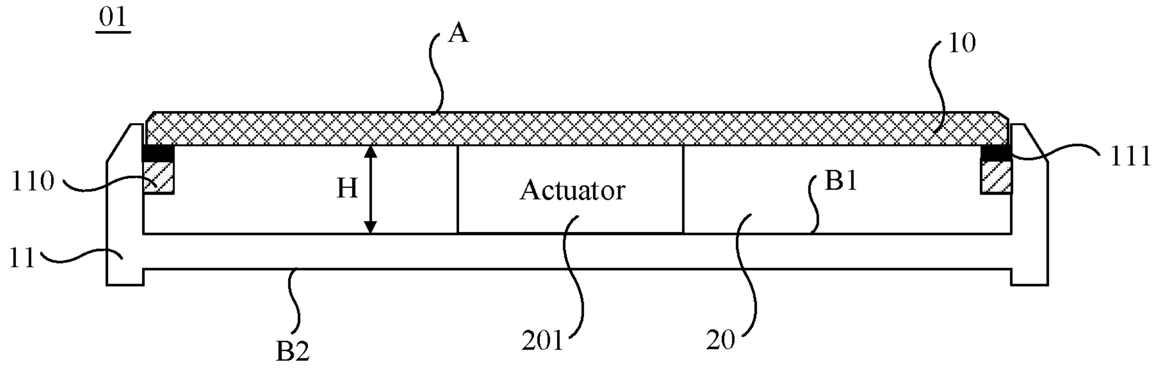
FIG. 4 is a schematic diagram of a structure of a mobile terminal with an actuator according to an embodiment of this application.

As shown in FIG. 4, a bearing table 110 in a ring shape is disposed on a side that is of the middle frame 11 and that is close to the display module 10. A foam adhesive 111 is pasted on the bearing table 110. The display module 10 is fastened to the middle frame 11 by using the foam adhesive 111, so that the display module 10 is connected to the middle frame 11.

A gap H exists between a back facet of the display module 10 fastened to the bearing table 110 and a first surface B1 of the middle frame 11, and the gap H forms accommodating space 20.

It should be noted that the display module 10 has a light-emitting surface that can display an image. The back facet of the display module 10 is a surface of a side that is of the display module 10 and that is opposite to the light-emitting surface, that is, a surface of a side that is of the display module 10 and that is close to the middle frame 11.

In addition, internal components such as a battery, a printed circuit board (PCB), a camera, and an antenna are mounted on a second surface B2 of the middle frame 11.

It should be noted that the first surface B1 and the second surface B2 of the middle frame 11 are disposed opposite to each other. The first surface B1 is close to the display module 10, and the second surface B2 is close to the housing 12.

The housing 12 is mounted on the middle frame 11, and the housing 12 can protect the foregoing internal components mounted on the second surface B2 of the middle frame 11.

In addition, the mobile terminal 01 further includes at least one actuator 201 shown in FIG. 4. The actuator 201 is connected to the display module 10 and the middle frame 11.

In this case, the actuator 201 is further electrically connected to a first signal end S1 (shown in FIG. 1) of the CPU. The actuator 201 is configured to: receive a first drive signal provided by the first signal end S1, and drive, based on the first drive signal, the display module 10 to vibrate in a direction perpendicular to a light-emitting surface A of the display module 10.

In some embodiments of this application, the first drive signal may be an intermediate-frequency or high-frequency signal, for example, a signal whose frequency is higher than 250 Hz. For example, when the mobile terminal 01 is a mobile phone, the first drive signal may be an audio analog signal that is sent by the CPU of the mobile phone to the actuator 201 and that corresponds to an audio digital signal.

It can be learned from the foregoing descriptions that the display module 10 is mounted on the bearing table 110 by using the foam adhesive 111. The foam adhesive 111 is elastic to some extent, and can be deformed under an action of an external force. In this way, when the actuator 201 vibrates, based on the first drive signal, in the direction perpendicular to the light-emitting surface A of the display module 10, the actuator 201 drives the display module 10 to move up and down, relative to the middle frame 11, at a small amplitude and a high frequency.

In this case, the small-amplitude and high-frequency vibration of the display module 10 cannot drive the middle frame 11 to vibrate. Therefore, the middle frame 11 is approximately in a static state.

In this case, driven by the actuator 201, the display module 10 is used as a diaphragm to push air to generate sound in the vibration process, to implement sound on display.

In an embodiment, when the actuator 201 is connected to the display module 10, a part that is of the display module 10 and with which the actuator 201 is in contact may be the BLU shown in FIG. 2, or the OLED shown in FIG. 3, or the cover CG shown in FIG. 2 or FIG. 3. In some terminals, an area of the cover is larger than an area of the display panel. Therefore, the actuator may be in contact only with the cover.

It should be understood that the actuator 201 may alternatively drive another component, for example, the housing 12, of the mobile terminal to generate sound. In this case, the actuator 201 may be disposed between the middle frame 11 and the housing 12, and the actuator 201 is connected to the middle frame 11 and the housing 12.

For example, the housing 12 is a battery back cover. In this case, the actuator 201 is connected to the middle frame and the battery back cover. In this case, the actuator 201 receives the first drive signal provided by the first signal end S1, drives, based on the received first drive signal in a direction perpendicular to the battery back cover, the battery back cover to move up and down at a small amplitude and a high frequency relative to the middle frame 11, and drives the battery back cover to vibrate at a small amplitude and a high frequency. As a diaphragm, the battery back cover pushes air to generate sound in a vibration process. In this way, the battery back cover generates the sound. For ease of understanding, an example in which the actuator 201 implements sound on display is mainly used for description in the embodiments of this application.

It can be learned from the foregoing descriptions that the display panel 101 in the display module 10 may be the LCD or the OLED display. In addition, compared with the LCD, the OLED display can self-illuminate. Therefore, no BLU needs to be disposed in the display module 10, and the display module 10 is thin. When the display module 10 is used as the diaphragm to implement sound on display, deformation is more likely to occur, so that a sound effect of the diaphragm is better.

In this case, a partial structure of the actuator 201, the display module 10, and the foam adhesive 111 used to fasten the display module 10 to the middle frame 11 form a sound system used to implement sound on display. In this case, the partial structure of the actuator 201, the display module 10, and an elastic coefficient of the foam adhesive 111 may affect a resonance frequency of the sound system.

Based on this, to make the sound system have a good vibration effect, a frequency of the first drive signal is the same as or approximately the same as the resonance frequency of the sound system.

Figure 5:
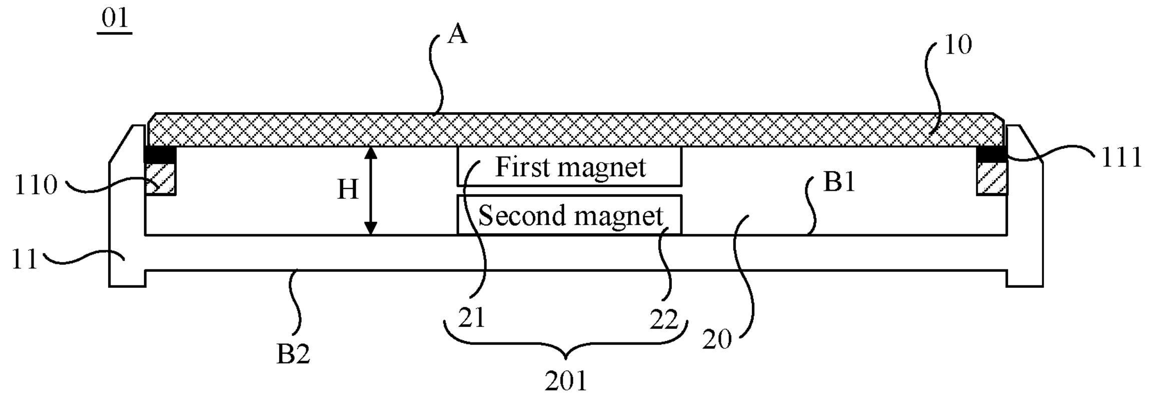
FIG. 5 is a schematic diagram of a structure of the actuator in the mobile terminal shown in FIG. 4.

In some embodiments of this application, as shown in FIG. 5, the actuator 201 includes a first magnet 21 and a second magnet 22. The first magnet 21 is disposed on a back facet of the display module 10, the second magnet 22 is disposed on the middle frame 11, and positions of the first magnet 21 and the second magnet 22 are disposed opposite to each other. In addition, at least a part of the first magnet 21 and at least a part of the second magnet 22 are located in the accommodating space 20.

In the embodiments of this application, there is an interaction force between a magnetic field generated by the first magnet and a magnetic field generated by the second magnet. Under action of the magnetic field generated by the first magnet and the magnetic field generated by the second magnet, the first magnet may vibrate in a direction perpendicular to the light-emitting surface of the display module. Because the first magnet is disposed on the back facet of the display module, the first magnet drives the display module to move up and down at a small amplitude and a high frequency relative to the middle frame. Driven by the first magnet, the display module, as a diaphragm, pushes air to generate sound in a vibration process, to implement sound on display, thereby implementing a function of a receiver or a horn. Because power of driving the display module to vibrate comes from an acting force between the magnetic field generated by the first magnet and the magnetic field generated by the second magnet, the acting force easily causes the display module to vibrate at a large amplitude, so that high sound is generated, and a sound on display effect can be improved.

The following describes, in detail by using examples, structures and disposing manners of the first magnet 21 and the second magnet 22 in the actuator 201.

Example 1

Figure 6:
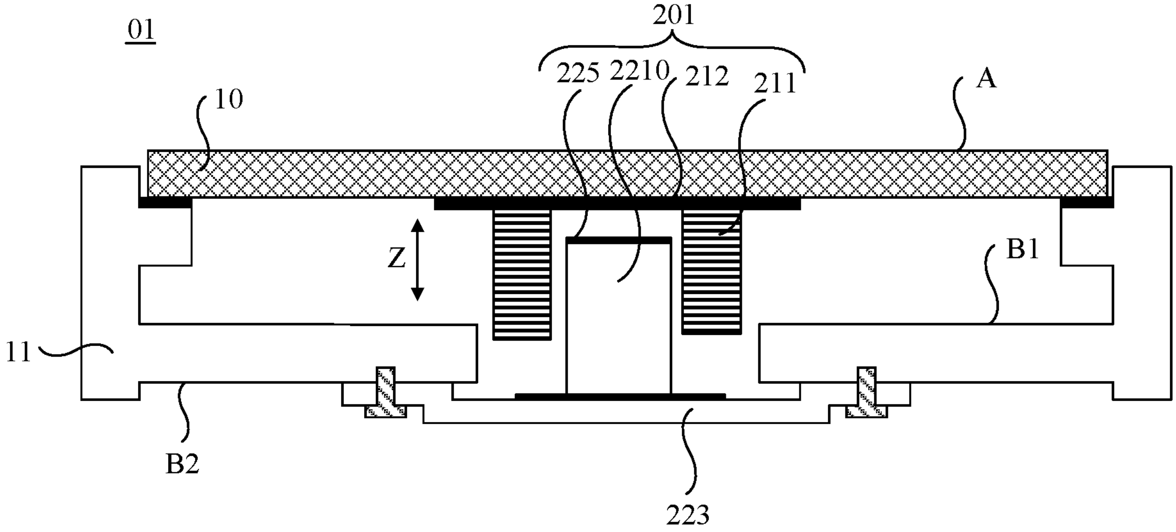
FIG. 6 is a schematic diagram of a structure of a first magnet and a second magnet in the mobile terminal shown in FIG. 5.

In this example, as shown in FIG. 6, the first magnet 21 is a coil 211, and the second magnet 22 is a main magnet 2210.

In this case, the coil 211 is disposed on the back facet of the display module 10, and the main magnet 2210 is disposed on the middle frame 11.

Figure 7:
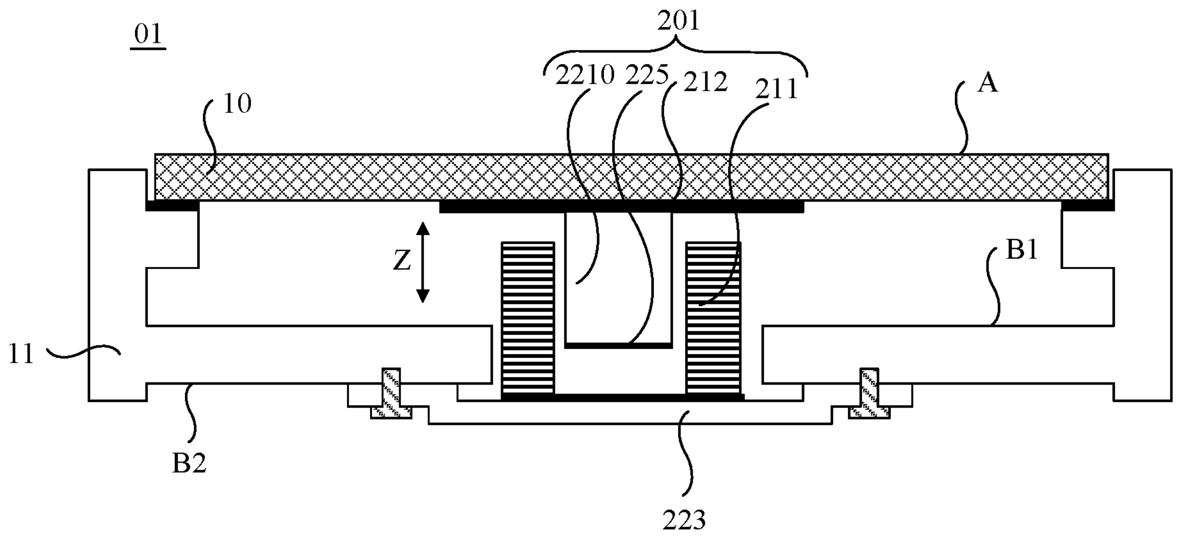
FIG. 7 is a schematic diagram of another structure of the first magnet and the second magnet in the mobile terminal shown in FIG. 5.

Alternatively, as shown in FIG. 7, the first magnet 21 is a main magnet 2210, and the second magnet is a coil 211.

In this case, the main magnet 2210 is disposed on the back facet of the display module 10, and the coil 211 is disposed on the middle frame 11.

In addition, in this example, a part of the main magnet 2210 is embedded in a closed region wound by a wire of the coil 211.

To enable the second magnet 22 (for example, the main magnet 2210 shown in FIG. 6 or the coil 211 shown in FIG. 7) to be disposed on the middle frame 11, in some embodiments of this application, as shown in FIG. 6 or FIG. 7, a hole is disposed on the middle frame 11.

The mobile terminal 01 includes a support 223. At least a part of the main magnet 2210 or the coil 211 is located in the hole on the middle frame 11.

The support 223 may be fastened to the second surface B2 (a surface of a side away from the display module 10) of the middle frame 11 through pasting by using an adhesive layer or through a threaded connection (a screw connection is used as an example in FIG. 6).

In this case, the second magnet 22 (for example, the main magnet 2210 shown in FIG. 6 or the coil 211 shown in FIG. 7) passes through the hole on the middle frame 11, and is disposed on the support 223. The second magnet 22 may be fastened, by using an adhesive layer, to a surface that is of the support 223 and that is close to the display module 10.

Figure 8:
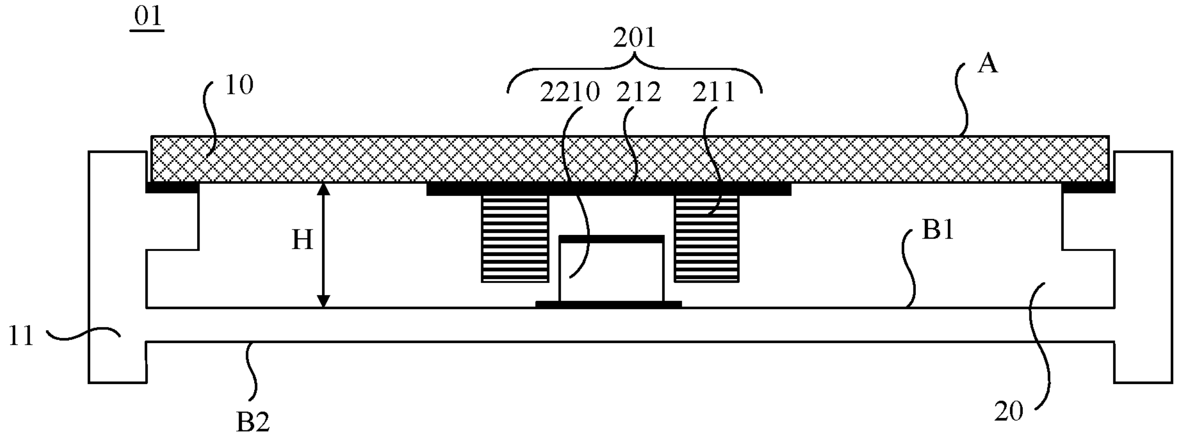
FIG. 8 is a schematic diagram of a structure of another mobile terminal with an actuator according to an embodiment of this application.

Alternatively, in some other embodiments of this application, as shown in FIG. 8, when the spacing H between the display module 10 and the middle frame 11 is large enough, the entire actuator 201 may be disposed between the display module 10 and the middle frame 11.

In this case, both the main magnet 2210 and the coil 211 are located in the accommodating space 20 between the display module 10 and the middle frame 11.

In this case, the second magnet 22 (for example, the main magnet 2210 shown in FIG. 8) may be directly fastened, by using an adhesive layer, to a surface of a side that is of the middle frame 11 and that is close to the display module 10.

In addition, in some embodiments of this application, positions of the main magnet 2210 and the coil 211 in FIG. 8 may alternatively be reversed. To be specific, the first magnet 21 is the main magnet 2210, and the second magnet 22 is the coil 211. Similarly, it can be learned that the coil 211 used as the second magnet 22 may be directly fastened, by using an adhesive layer, to a surface of a side that is of the middle frame 11 and that is close to the display module 10.

Based on this, the mobile terminal 01 shown in FIG. 6 is used as an example to describe a process in which the mobile terminal 01 implements sound on display.

Figure 9:
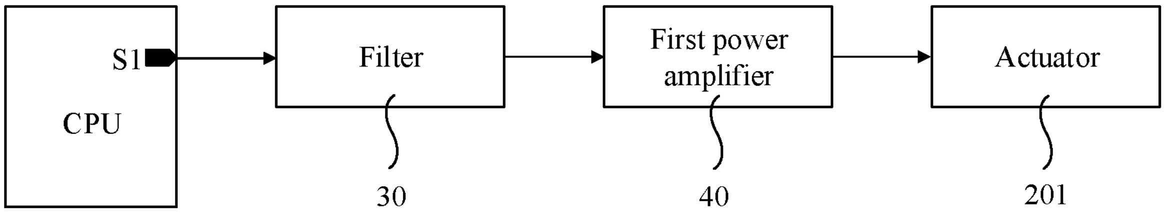
FIG. 9 is a schematic diagram of signal transmission for implementing sound on display by the mobile terminal shown in FIG. 5.

The coil 211 is electrically connected to the first signal end 51 of the CPU. In this case, to implement a sound on display mode, as shown in FIG. 9, a first drive signal provided by the first signal end 51 of the CPU is transmitted to the coil 211 in the actuator 201 after being processed by a filter 30 and a first power amplifier 40.

The filter 30 can filter out a low-frequency signal from the first drive signal, so that a frequency of the first drive signal is closer to a frequency of the sound system.

In addition, the first power amplifier 40 can amplify the signal output by the filter 30, to drive, by using an amplified first drive signal, the coil 211 in the actuator 201 to generate an alternating magnetic field.

In this case, when the coil 211 receives the first drive signal (that is, an intermediate-frequency or high-frequency signal), the coil 211 generates an alternating magnetic field under an action of the first drive signal.

A magnitude and a direction of the magnetic field generated by the coil 211 vary with the first drive signal. For example, when the coil 211 receives the first drive signal, if a current in the coil 211 is large, strength of the magnetic field generated by the coil 211 is large; or if a current in the coil 211 is small, strength of the magnetic field generated by the coil 211 is small.

In addition, a transmission direction of the current in the coil 211 may control the direction of the magnetic field generated by the coil 211.

The main magnet 2210 may be a permanent magnet, or an electromagnet receiving a constant current. In this case, the main magnet 2210 generates a constant magnetic field with constant strength and a constant direction.

It can be learned from the foregoing descriptions that the first drive signal is the intermediate-frequency or high-frequency signal, and the frequency of the first drive signal is close to the resonance frequency of the sound system. Therefore, under interaction between the foregoing two magnetic fields, the coil 211 in the sound system may be enabled to vibrate up and down in a magnetic line cutting manner at a small amplitude and a high frequency along the foregoing Z direction.

In the sound system, the coil 211 in the actuator 201 is connected to the display module 10. Therefore, in a process of vibrating up and down along the Z direction, the coil 211 can drive the display module 10 to vibrate up and down at a small amplitude and a high frequency along a same direction.

In this way, the coil 211, the display module 10, and the foam adhesive 111 used to fasten the display module 10 form the sound system, and the display module 10 is used as a diaphragm to push air to generate sound in the vibration process, so as to implement sound on display. In this case, the sound system can implement a function of a receiver or a speaker, to play an audio signal.

It should be noted that the frequency of the first drive signal is proportional to a vibration frequency of the display module 10. In addition, a magnitude of the first drive signal, that is, a magnitude of a current flowing into the coil 211, is proportional to vibration intensity of the display module 10. A direction of the first drive signal, namely, a direction of the current applied to the coil 211, is associated with a motion direction of the display module 10. When the direction of the current applied to the coil 211 changes, the motion direction of the display module 10 changes. Therefore, when the first drive signal is changed, a vibration form (including a vibration frequency, an amplitude, a direction, and the like) of the display module 10 driven by the coil 211 correspondingly changes, so that sound generated by the sound system is different.

Based on this, to improve a vibration effect of the display module 10, as shown in FIG. 6 or FIG. 7, the actuator 201 further includes a support plate 212. An upper surface of the support plate 212 is fastened to a surface of a side that is of the display module 10 and that is close to the middle frame 11, and a lower surface of the support plate 212 is fastened to the first magnet 21 (for example, the coil 211 shown in FIG. 6 or the main magnet 2210 shown in FIG. 7). In this case, the first magnet 21 is connected to the display module 10 through the support plate 212.

In this way, because the support plate 212 is of a sheet structure, a contact area between the support plate 212 and the display module 10 is larger than a direct contact area between the first magnet 11 and the display module 10. Therefore, the upper surface and the lower surface of the support plate 212 are respectively in contact with the display module 10 and the first magnet 21, so that a contact area between the first magnet 21 and the display module 10 can be increased, and a driving force provided for the display module 10 can be applied to the display module 10 more evenly in a vibration process of the first magnet 21.

In addition, based on the support plate 212, a deformed area of the display module 10 may be further expanded, so that vibration efficiency of the display module 10 driven by the first magnet 21 is increased, power consumption is reduced, and a sound on display effect is improved.

It should be noted that a material of which the support plate 212 is made may be a metal material such as a steel sheet or another hard material.

It can be learned from the foregoing descriptions that the first magnet 21 (for example, the coil 211 shown in FIG. 6 or the main magnet 2210 shown in FIG. 7), the display module 10, and the foam adhesive 111 constitute the foregoing sound system. The resonance frequency of the sound system may be determined based on the first magnet 21, an elastic coefficient of the support plate 212, the display module 10, and an elastic coefficient of the foam adhesive 111.

In addition, there is a large difference between the frequency of the first drive signal and a resonance frequency of the middle frame 11. Therefore, interaction between the magnetic field generated by the coil 211 and the magnetic field generated by the main magnet 2210 cannot drive the middle frame 11 to move up and down along a Z direction, and the middle frame 11 is in a static state.

In conclusion, in the mobile terminal 01 in this application, when the coil 211 in the actuator 201 receives the intermediate-frequency or high-frequency signal, the magnetic field generated by the coil 211 interacts with the magnetic field generated by the main magnet 2210, so that the coil 211 shown in FIG. 6 can drive the display module 10 to vibrate at a small amplitude and a high frequency. The display module 10 is used as the diaphragm to push air to generate sound. In this way, the coil 211, the display module 10, and the foam adhesive 111 used to fasten the display module 10 to the middle frame 11 form the sound system, to implement the function of the speaker or the receiver.

In this case, a sound hole does not need to be disposed in the mobile terminal 01, so that a problem that sound quality is affected because the sound hole is blocked can be resolved. In addition, a hole opening process in the mobile terminal 01 is reduced, so that a surface of a display side of the mobile terminal 01 is more flat and rounded.

It should be noted that the structure shown in FIG. 6 is used as an example for description above, processes of implementing sound on display shown in FIG. 7 and FIG. 8 are the same as those described above, and details are not described herein again.

In addition, in FIG. 7, the coil 211 is used as the second magnet 22 and is disposed on the middle frame 11. For example, a lower surface of the coil 211 may be fastened, by using an adhesive layer, to an upper surface of the support 223 connected to the middle frame 11. In this way, it can be learned from the foregoing descriptions that the coil 211 needs to be electrically connected to the first signal end S1 of the CPU mounted on the middle frame 11, to separately receive the first drive signal provided by the first signal end S1. Therefore, the coil 211 is also mounted on the middle frame 11, so that a manner of an electrical connection between the coil 211 and the CPU can be simplified, and reliability of the electrical connection between the coil 211 and the CPU can be improved.

In addition, the first magnet 21 is used as the main magnet 2210 and is disposed on the back facet of the display module 10. This can avoid a problem that a display effect of the display module 10 is reduced because the coil 211 is heated after the coil 211 is powered on in a solution in which the coil 211 is used as the first magnet 21 and is connected to the display module 10.

Example 2

Figure 10:
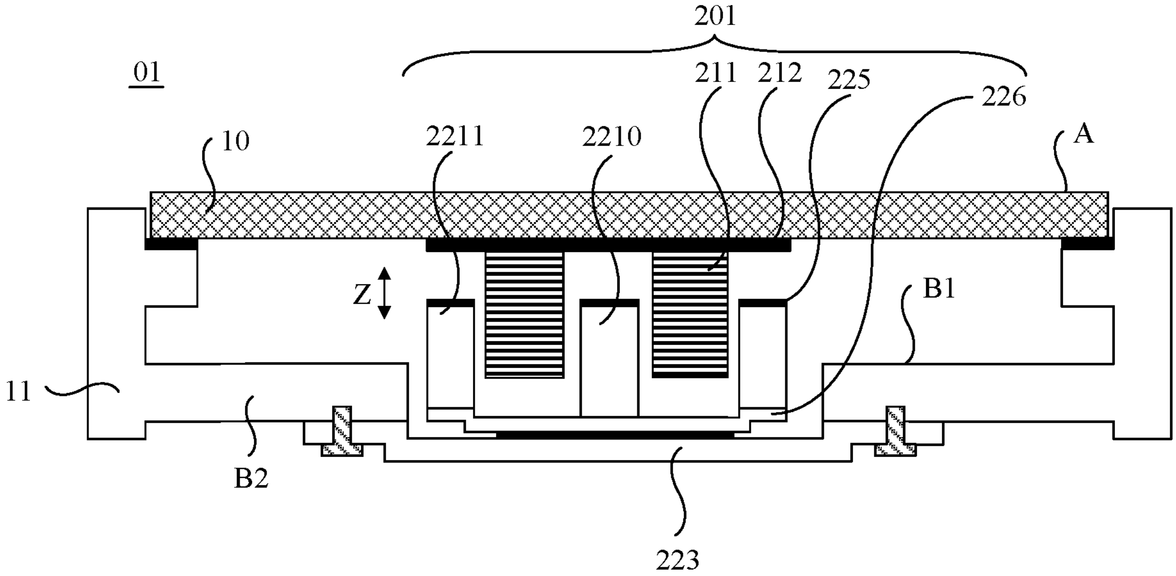
FIG. 10 is a schematic diagram of another structure of the first magnet and the second magnet in the mobile terminal shown in FIG. 5.

In this example, as shown in FIG. 10, the first magnet 21 is a coil 211, and the second magnet 22 is a main magnet 2210.

A part of the main magnet 2210 is embedded in a closed region wound by a wire of the coil 211.

In addition, a difference from Example 1 lies in that, as shown in FIG. 10, the actuator 201 further includes at least one auxiliary magnet 2211 located around the main magnet 2210.

The auxiliary magnet 2211 and the main magnet 2210 are located on a same side. In this case, as shown in FIG. 10, when the main magnet 2210 is disposed on the middle frame 11 by using the support 223, the auxiliary magnet 2211 is also disposed on the middle frame 11. Alternatively, when the main magnet 2210 is disposed on the back facet of the display module 10 by using a support plate 212, the auxiliary magnet 2211 is also disposed on the back facet of the display module 10.

In addition, there is a gap between the auxiliary magnet 2211 and the main magnet 2210. A part of the coil 211 is located in the gap between the auxiliary magnet 2211 and the main magnet 2210.

Figure 11:
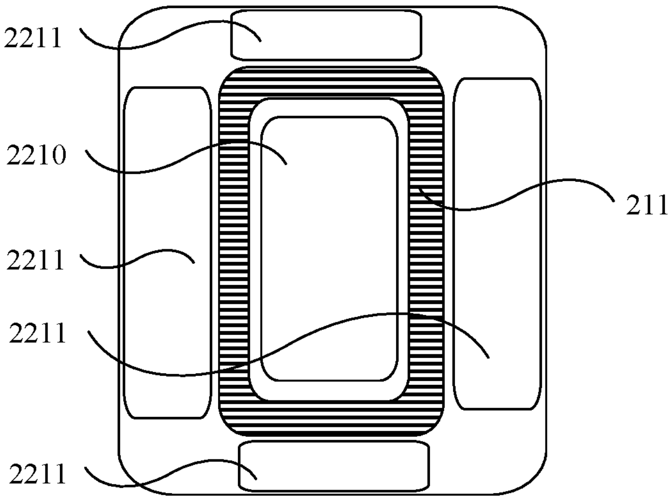
FIG. 11 is a top view of a coil and a main magnet shown in FIG. 10.
Figure 12:
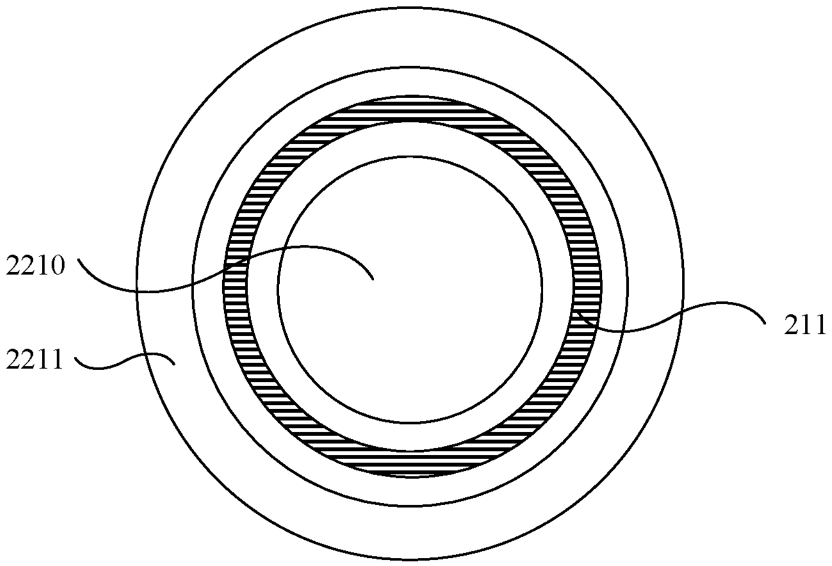
FIG. 12 is another top view of the coil and the main magnet shown in FIG. 10.

In this case, as shown in FIG. 11 or FIG. 12, the main magnet 2210 is located in the closed region wound by the wire of the coil 211. As shown in FIG. 11, four auxiliary magnets 2211 are disposed around the main magnet 2210 to form five magnetic circuits. Alternatively, as shown in FIG. 12, a circular main magnet 2210 is located in an annular auxiliary magnet 2211 to form double magnetic circuits.

In this way, the magnetic field generated by the coil 211 can not only interact with the magnetic field generated by the main magnet 2210, but also interact with a magnetic field generated by the at least one auxiliary magnet 2211, to improve vibration intensity of the coil 211 or vibration intensity of the main magnet 2210.

In addition, to support the main magnet 2210, or the main magnet 2210 and the auxiliary magnet 2211, as shown in FIG. 10, the actuator 201 further includes a magnetic bowl 226. An upper surface of the magnetic bowl 226 is fastened to lower surfaces of the main magnet 2210 and the auxiliary magnet 2211 by using an adhesive layer. A lower surface of the magnetic bowl 226 passes through a hole in the middle frame 11, and is fastened to an upper surface of the support 223 by using an adhesive layer.

The magnetic bowl 226 may be made of stainless steel. In this case, the magnetic bowl 226 may have a magnetic shielding function, to reduce a probability that magnetic fields generated by the main magnet 2210 and the auxiliary magnet 2211 have adverse impact on another device in the mobile terminal 01.

In addition, to improve uniformity of the magnetic fields generated by the main magnet 2210 and the auxiliary magnet 2211, the actuator 201 further includes a washer 225 (a black cover layer that is of the main magnet 2210 and the auxiliary magnet 2211 and that is close to an upper surface of the display module 10 in FIG. 10) covered on a surface of a side that is of the main magnet 2210 and the auxiliary magnet 2211 and that is close to the display module 10. The washer 225 is made of low-carbon steel. The washer has a magnetic conduction function, to reduce magnetic resistance of the main magnet 2210 and the auxiliary magnet 2211, and the washer 225 also has the magnetic shielding function. It should be noted that the mobile terminal 01 shown in FIG. 10 can also implement the sound on display process described in Example 1. Details are not described herein again.

In addition, in some embodiments of this application, positions of the main magnet 2210, the auxiliary magnet 2211, and the coil 211 in FIG. 10 may alternatively be reversed. To be specific, the first magnet 21 is the main magnet 2210, and the second magnet 22 is the coil 211. In this case, the main magnet 2210 and the auxiliary magnet 2211 are fastened to the back facet of the display module 10, and the coil 211 is fastened to the upper surface of the support 223 by passing through the hole on the middle frame. In this case, the washer 225 covers a surface of a side that is of the main magnet 2210 and the auxiliary magnet 2211 and that is away from the display module 10. A process in which a mobile terminal having this structure implements sound on display is the same as that described above. Details are not described herein again.

Example 3

Figure 13:
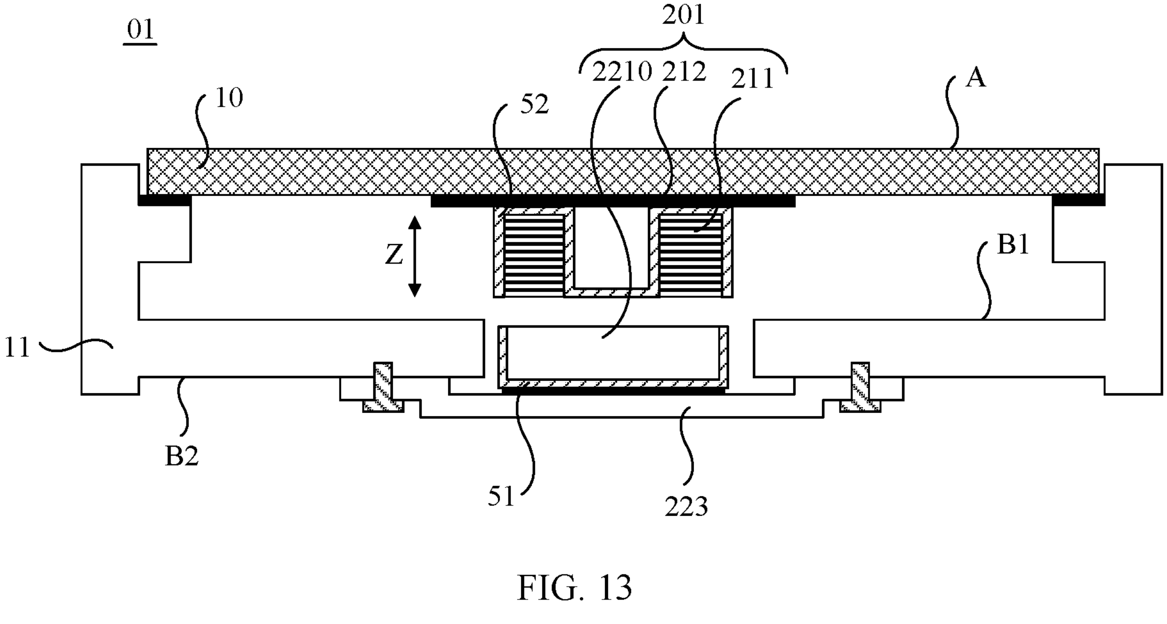
FIG. 13 is a schematic diagram of another structure of the first magnet and the second magnet in the mobile terminal shown in FIG. 5.

In this example, as shown in FIG. 13, the first magnet 21 is a coil 211, and the second magnet 22 is a main magnet 2210.

In this case, the coil 211 may be disposed on the back facet of the display module 10, and the main magnet 2210 is disposed on the middle frame 11.

Figure 14:
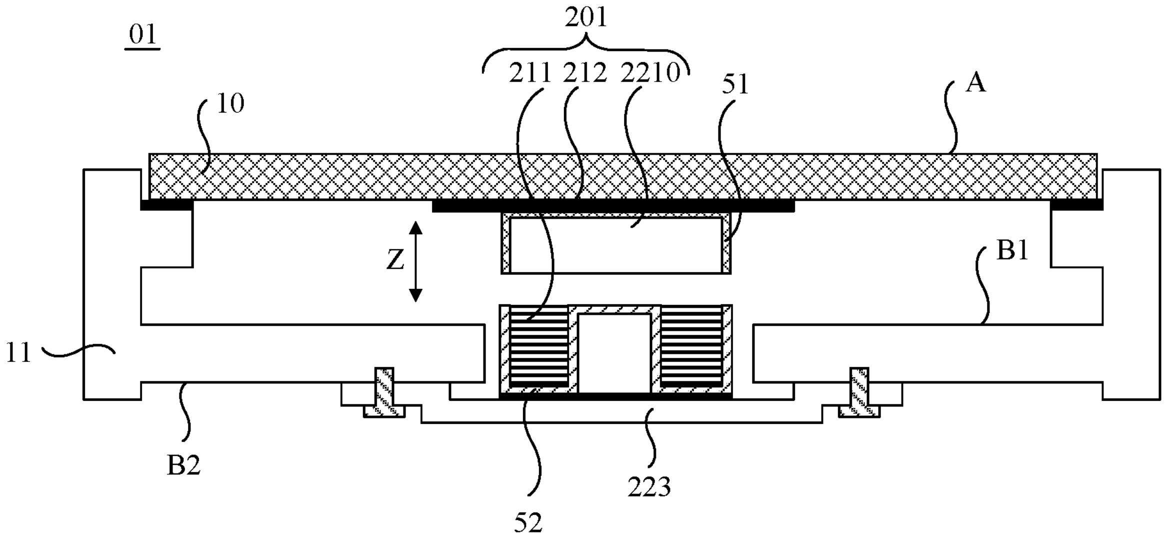
FIG. 14 is a schematic diagram of another structure of the first magnet and the second magnet in the mobile terminal shown in FIG. 5.

Alternatively, as shown in FIG. 14, the first magnet 21 is a main magnet 2210, and the second magnet 22 is a coil 211.

In this case, the main magnet 2210 may be disposed on the back facet of the display module 10, and the coil 211 is disposed on the middle frame 11.

In this example, a top view structure of the coil 211 may use the annular structure shown in FIG. 11 or 12.

In addition, a difference from Example 1 lies in that the main magnet 2210 is located outside a closed region wound by a wire of the coil 211. Opposite surfaces of the main magnet 2210 and the coil 211 are parallel.

In this way, in a process of assembling the actuator 201, the main magnet 2210 does not need to be embedded in the closed region wound by the wire of the coil 211, resolving a problem that the main magnet 2210 and the closed region wound by the wire of the coil 211 cannot be aligned. Therefore, alignment precision of the main magnet 2210 and the coil 211 is reduced, and difficulty in assembling the entire mobile terminal 01 is reduced.

Figure 15:
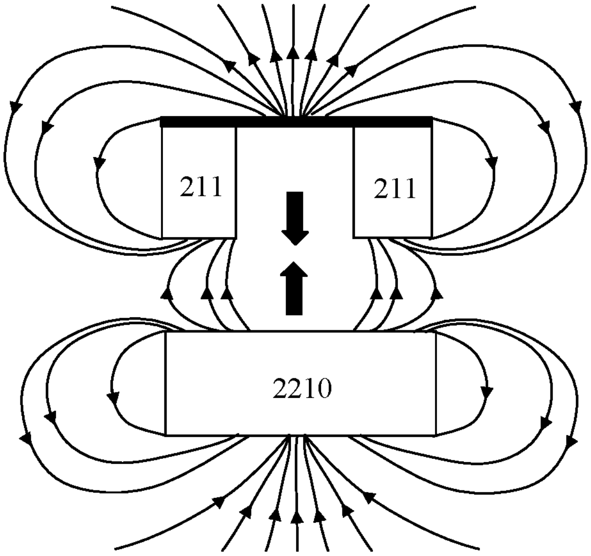
FIG. 15 is a schematic diagram of interaction between a magnetic field generated by a coil and a magnetic field generated by a main magnet shown in FIG. 13.

In this case, after the coil 211 is powered on, as shown in FIG. 15, a magnetic field generated by the coil 211 and a magnetic field generated by the main magnet 2210 may generate an attraction force.

Figure 16:
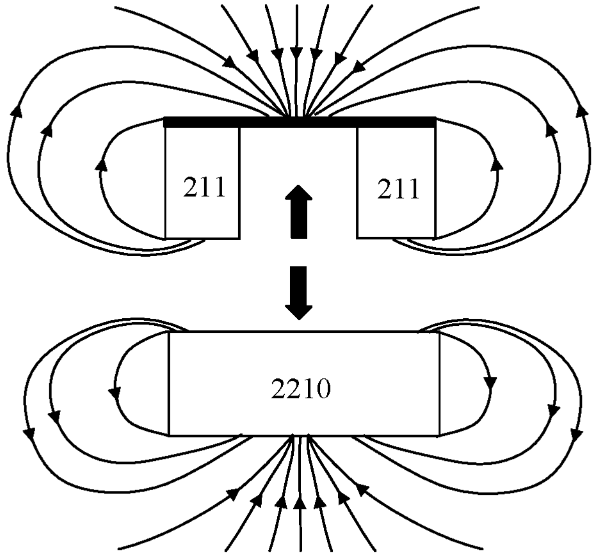
FIG. 16 is another schematic diagram of interaction between the magnetic field generated by the coil and the magnetic field generated by the main magnet shown in FIG. 13.

Alternatively, after a direction of a current flowing into the coil 211 changes, as shown in FIG. 16, a magnetic field generated by the coil 211 and a magnetic field generated by the main magnet 2210 may generate a repulsive force.

In this case, under an effect of the magnetic field generated by the coil 211 and the magnetic field generated by the main magnet 2210, vibration directions of the coil 211 and the main magnet 2210 are opposite.

It should be noted that when the powered-on coil 211 and the main magnet 2210 vibrate close to each other, opposite surfaces of the two are not in contact with each other. When the powered-on coil 211 and the main magnet 2210 vibrate away from each other, there is a specific distance between the opposite surfaces of the two. To avoid increasing the thickness of the mobile terminal 01, the distance may be less than or equal to 0.7 mm. In some embodiments of this application, the distance may be further less than or equal to 0.4 mm.

The mobile terminal 01 shown in FIG. 13 and FIG. 14 can also implement the foregoing sound on display process. A difference lies in that, in this example, when the coil 211 in the actuator 201 receives the first drive signal, the magnetic field generated by the coil 211 and the magnetic field generated by the main magnet 2210 enable the coil 211 and the main magnet 2210 to attract or repel each other, so that the first magnet 21 (for example, the coil 211 shown in FIG. 13, or the main magnet 2210 shown in FIG. 14) vibrates, relative to the second magnet 22 (for example, the main magnet 2210 shown in FIG. 13, or the coil 211 shown in FIG. 14), at a small amplitude and a high frequency along a Z direction. In this way, the first magnet 21 drives the display module 10 to vibrate at a small amplitude and a high frequency, to implement sound on display.

In addition, to reduce a probability that the magnetic fields generated by the coil 211 and the main magnet 2210 have adverse impact on another device in the mobile terminal, the mobile terminal 01 provided in some embodiments of this application further includes a first magnetic shield 51 and a second magnetic shield 52 shown in FIG. 13 or FIG. 14.

For the main magnet 2210, all surfaces other than a surface of a side facing the coil 211 are wrapped by the first magnetic shield 51.

For the coil 211, all surfaces other than at least a surface of a side facing the main magnet 2210 are wrapped by the second magnetic shield 52.

In this case, an upper surface of a support plate 212 is fastened to a surface of a side that is of the display module 10 and that is close to the middle frame 11, and a lower surface of the support plate 212 is fastened to the first magnet 21 (for example, the coil 211 shown in FIG. 13 or the main magnet 2210 shown in FIG. 14) by using the first magnetic shield 51 or the second magnetic shield 52. As shown in FIG. 13, the lower surface of the support plate 212 is connected to the second magnetic shield 52, and the coil 211 is wrapped in the second magnetic shield 52, in other words, the lower surface of the support plate 212 is connected to the coil 211 by using the second magnetic shield 52. As shown in FIG. 14, the lower surface of the support plate 212 is connected to the first magnetic shield 51, and the main magnet 2210 is wrapped in the first magnetic shield 51, in other words, the lower surface of the support plate 212 is connected to the main magnet 2210 by using the first magnetic shield 51.

Example 4

Figure 17:
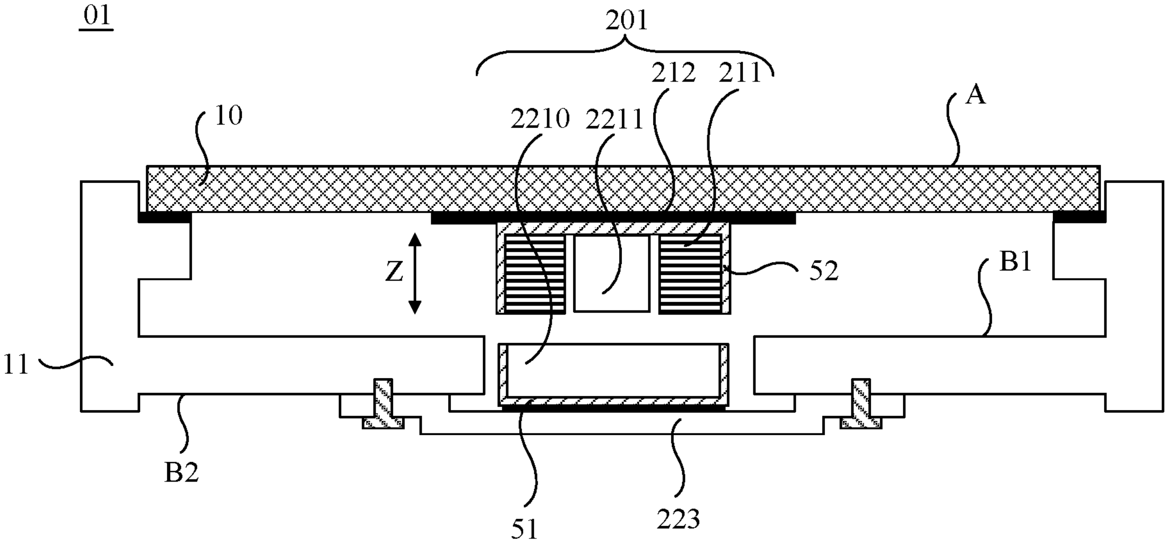
FIG. 17 is a schematic diagram of another structure of the first magnet and the second magnet in the mobile terminal shown in FIG. 5.

In this example, as shown in FIG. 17, the first magnet 21 is a coil 211, and the second magnet 22 is a main magnet 2210.

The main magnet 2210 is located outside a closed region wound by a wire of the coil 211. Opposite surfaces of the main magnet 2210 and the coil 211 are parallel. A structure of the coil 211 is the same as that in Example 3.

A difference from Example 3 lies in that, as shown in FIG. 17, the actuator 201 further includes an auxiliary magnet 2211. The auxiliary magnet 2211 and the coil 211 are located on a same side, and the auxiliary magnet 2211 is embedded in the closed region wound by the wire of the coil 211.

In this way, the magnetic field generated by the coil 211 can not only interact with the magnetic field generated by the main magnet 2210, but also interact with a magnetic field generated by the auxiliary magnet 2211, to improve vibration intensity of the coil 211 or vibration intensity of the main magnet 2210. In an embodiment, after a current is applied to the coil 211, magnetic flux passing through the coil 211 includes magnetic flux that is of a magnetic field generated by the main magnet 2210 and that passes through the coil 211 and magnetic flux that is of a magnetic field generated by the auxiliary magnet 2211 and that passes through the coil 211. In this way, magnetic induction intensity of the coil 211 is larger, and an acting force of the magnetic fields between the coil 211 and the main magnet 2210 is larger, so that vibration intensity of the coil 211 or vibration intensity of the main magnet 2210 is improved.

In addition, when the mobile terminal 01 includes the auxiliary magnet 2211, because the auxiliary magnet 2211 and the coil 211 are located on a same side, the auxiliary magnet 2211 is located in the second magnetic shield 52. A surface that is of the coil 211 and that is opposite to the auxiliary magnet 2211 is not covered by the second magnetic shield 52. In this case, the first magnetic shield 51 and the second magnetic shield 52 are U-shaped.

Based on this, the first magnetic shield 51 and the second magnetic shield 52 are made of a magnetic conductive material, so as to reduce diffusion of a magnetic line in the magnetic fields generated by the main magnet 2210 and the coil 211, thereby reducing magnetic resistance.

It should be noted that the mobile terminal 01 shown in FIG. 17 can also implement the sound on display process described above. Details are not described herein again.

Figure 18:
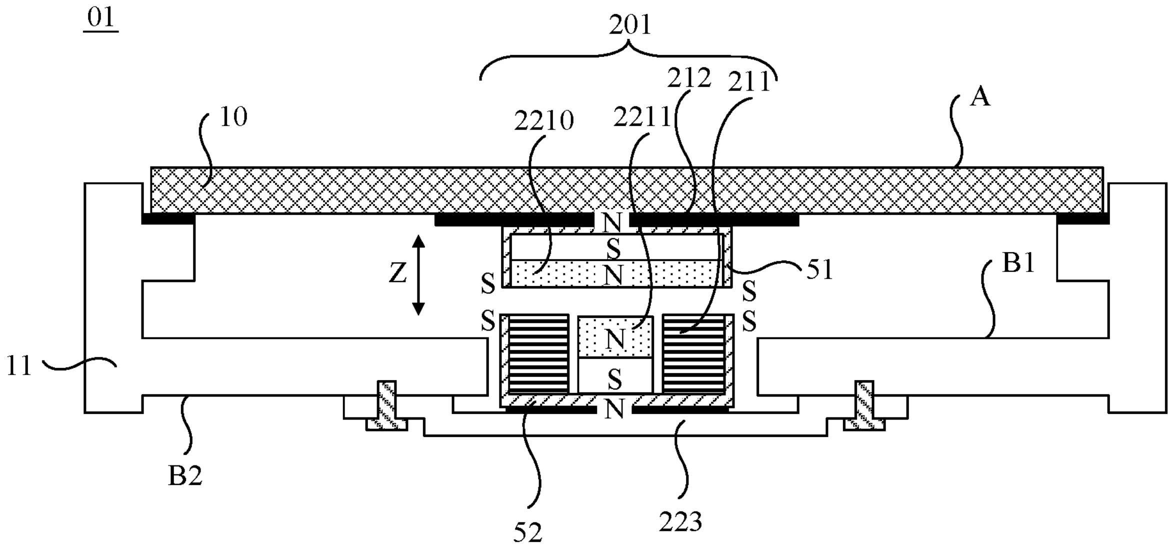
FIG. 18 is a schematic diagram of another structure of the first magnet and the second magnet in the mobile terminal shown in FIG. 5.

In addition, in some embodiments of this application, positions of the main magnet 2210, the coil 211, and the auxiliary magnet 2211 in FIG. 17 may be reversed. As shown in FIG. 18, to be specific, the first magnet 21 is the main magnet 2210, and the second magnet 22 is the coil 211. In this case, the main magnet 2210 is fastened to the back facet of the display module 10, and the coil 211 and the auxiliary magnet 2211 are fastened to the upper surface of the support 223 by passing through the hole on the middle frame 11. A process in which a mobile terminal having this structure implements sound on display is the same as that described above. Details are not described herein again. In FIG. 18, the auxiliary magnet 2211 is disposed on a same side as the coil 211. Therefore, after a current is applied to the coil 211 (in other words, the actuator 201 is in a working state), the magnetic field generated by the coil 211 not only can interact with the magnetic field generated by the main magnet 2210, but also can interact with the magnetic field generated by the auxiliary magnet 2211, so that vibration intensity of the main magnet 2210 can be improved.

The main magnet 2210 shown in FIG. 17 or FIG. 18 may be a permanent magnet or an electromagnet receiving a constant current. The auxiliary magnet 2211 may be a permanent magnet or an electromagnet receiving a constant current. When both the main magnet 2210 and the auxiliary magnet 2211 are permanent magnets, opposite sides (or close ends) of the main magnet 2210 and the auxiliary magnet 2211 may be set to a same pole, and distant sides (or close ends) are certainly a same pole. In this case, there is a repulsive force between the main magnet 2210 and the auxiliary magnet 2211. Opposite sides of the main magnet 2210 and the auxiliary magnet 2211 may be set to different poles, and distant sides are certainly different poles. In this case, there is an attraction force between the main magnet 2210 and the auxiliary magnet 2211.

FIG. 18 shows a magnetic pole setting manner of the main magnet 2210 and the auxiliary magnet 2211. As shown in FIG. 18, the main magnet 2210 and the auxiliary magnet 2211 are disposed opposite to each other. An end that is of the main magnet 2210 and that is close to the auxiliary magnet 2211 is set to an N pole, and an end that is of the main magnet 2210 and that is away from the auxiliary magnet 2211 (in other words, close to the display module 10) is set to an S pole. Correspondingly, an end that is of the auxiliary magnet 2211 and that is close to the main magnet 2210 is set to an N pole, and an end that is of the auxiliary magnet 2211 and that is away from the main magnet 2210 (in other words, close to a support 223) is set to an S pole. In other words, opposite ends of the main magnet 2210 and the auxiliary magnet 2211 are set to a same pole, and distant ends of the main magnet 2210 and the auxiliary magnet 2211 are set to a same pole, so that there is a repulsive force between the main magnet 2210 and the auxiliary magnet 2211. FIG. 18 shows a magnetic pole setting manner. To be specific, opposite ends of the main magnet 2210 and the auxiliary magnet 2211 are set to N poles, and distant ends of the main magnet 2210 and the auxiliary magnet 2211 are set to S poles. In some embodiments of this application, there is another magnetic pole setting manner in which opposite ends of the main magnet 2210 and the auxiliary magnet 2211 are set to S poles and distant ends of the main magnet 2210 and the auxiliary magnet 2211 are set to N poles.

Taking the magnetic pole setting manner shown in FIG. 18 as an example, when the actuator 201 is in a non-working state (in other words, no current is applied to the coil 211), each of the main magnet 2210 and the auxiliary magnet 2211 generates a magnet field. The main magnet 2210 is wrapped by the first magnetic shield 51. When the first magnetic shield 51 uses a magnetic conductive material, the first magnetic shield 51 is attracted by the main magnet 2210 in the magnetic field generated by the main magnet 2210. After a period of time, the first magnetic shield 51 is magnetized by the main magnet 2210 and is magnetic. An end that is of the first magnetic shield 51 and that is close to the S pole of the main magnet 2210 is magnetized to an N pole, and an end that is of the first magnetic shield 51 and that is away from the S pole of the main magnet 2210 (namely, an edge of the first magnetic shield 51 when the first magnetic shield 51 is U-shaped) is correspondingly magnetized to an S pole. Similarly, the auxiliary magnet 2211 is wrapped by the second magnetic shield 52. When the second magnetic shield 52 uses a magnetic conductive material, the second magnetic shield 52 is attracted by the auxiliary magnet 2211 in the magnetic field generated by the auxiliary magnet 2211. After a period of time, the second magnetic shield 52 is magnetized by the auxiliary magnet 2211 and is magnetic. An end that is of the second magnetic shield 52 and that is close to the S pole of the auxiliary magnet 2211 is magnetized to an N pole, and an end that is of the second magnetic shield 52 and that is away from the S pole of the auxiliary magnet 2211 (namely, an edge of the second magnetic shield 52 when the second magnetic shield 52 is U-shaped) is correspondingly magnetized to an S pole.

In an embodiment, referring to FIG. 18, when the actuator 201 is in the non-working state, the first magnetic shield 51 and the second magnetic shield 52 are respectively magnetized by the main magnet 2210 and the auxiliary magnet 2211 and are magnetic. With reference to a central position on a side that is of the main magnet 2210 and that is close to the auxiliary magnet 2211, because opposite ends of the main magnet 2210 and the auxiliary magnet 2211 are N poles, the magnetic field generated by the main magnet 2210 and the magnetic field generated by the auxiliary magnet 2211 may generate a repulsive force, and the main magnet 2210 and the auxiliary magnet 2211 tend to move away from each other. Still with reference to the central position on the side that is of the main magnet 2210 and that is close to the auxiliary magnet 2211, because opposite ends of the main magnet 2210 and the second magnetic shield 52 are different poles, the magnetic field generated by the main magnet 2210 and a magnetic field generated by the second magnetic shield 52 may generate an attraction force, and the main magnet 2210 and the second magnetic shield 52 tend to move close to each other. For the main magnet 2210, the main magnet 2210 may be in a balanced state and hardly stressed under combined action of the magnetic field generated by the auxiliary magnet 2211 and the magnetic field generated by the second magnetic shield 52. Similarly, the auxiliary magnet 2211 may be in a balanced state and hardly stressed under combined action of the magnetic field generated by the main magnet 2210 and a magnetic field generated by the first magnetic shield 51, the first magnetic shield 51 may be in a balanced state and hardly stressed under combined action of the magnetic field generated by the auxiliary magnet 2211 and the magnetic field generated by the second magnetic shield 52, and the second magnetic shield 52 may be in a balanced state and hardly stressed under combined action of the magnetic field generated by the main magnet 2210 and the magnetic field generated by the first magnetic shield 51.

Therefore, in the magnetic pole setting manner shown in FIG. 18, when the actuator 201 is in the non-working state, the first magnet 21 (for example, the coil 211 shown in FIG. 17 or the main magnet 2210 shown in FIG. 18) and the second magnet 22 (for example, the main magnet 2210 shown in FIG. 17 or the coil 211 shown in FIG. 18) may be in a balanced state. In this way, the display module 10 also keeps balanced, and connection reliability between the first magnet 21 (for example, the coil 211 shown in FIG. 17 or the main magnet 2210 shown in FIG. 18) and the display module 10 is improved, thereby avoiding the following problem: When opposite ends of the main magnet 2210 and the auxiliary magnet 2211 are set to different poles or no auxiliary magnet 2211 is disposed, there is an attraction force between the first magnet 21 and the second magnet 22, and consequently, the display module 10 is pulled by the first magnet 21 and is deformed, for example, the display module 10 is concave downward, and the first magnet 21 is separated from the display module 10.

It should be noted that, when no auxiliary magnet 2211 is disposed, there may be an attraction force between the first magnet 21 and the second magnet 22. Specifically, for example, in Example 1 to Example 3, when the main magnet 2210 is quite close to the coil 211, the main magnet 2210 may magnetize the coil 211, so that there is an attraction force between the coil 211 and the main magnet 2210.

It should be understood that, that the first magnet 21 and the second magnet 22 are in a balanced state may actually mean that a system including the main magnet 2210, the coil 211, the auxiliary magnet 2211, the first magnetic shield 51, the second magnetic shield 52, and the like is in a balanced state, or mean that a first actuator part (which may be considered as an upper actuator in FIG. 18) including the main magnet 2210 and the first magnetic shield 51 and a second actuator part (which may be considered as a lower actuator in FIG. 18) including the coil 211, the auxiliary magnet 2211, and the second magnetic shield 52 are in a balanced state. One of the first actuator part and the second actuator part (namely, the upper actuator) is fastened to the back facet of the display module 10, and the other actuator part (namely, the lower actuator part) is fastened to the middle frame. The first actuator part and the second actuator part are independent of each other.

It should also be understood that, in an actual application, to reach a balanced state of the first magnet 21 and the second magnet 22 when the actuator 201 is in the non-working state, a corresponding design may be made based on specifications of the first magnet 21 and the second magnet 22. In some embodiments, when the actuator 201 is in the non-working state, there may be a repulsive force or an attraction force that does not exceed a preset value between the first magnet 21 and the second magnet 22, so that the display module 10 is not greatly deformed.

Figure 19:
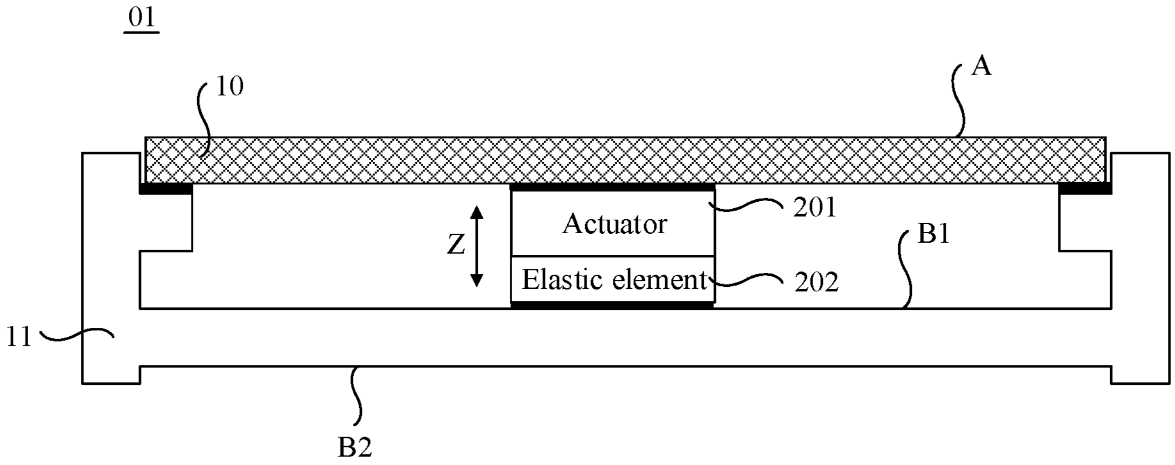
FIG. 19 is a schematic diagram of a structure of a mobile terminal with an actuator and an elastic element according to an embodiment of this application.

The foregoing describes a structure of the mobile terminal 01 by using an example in which the mobile terminal 01 implements sound on display. In some embodiments of this application, as shown in FIG. 19, the mobile terminal 01 further includes an elastic element 202 connected to the actuator 201. The elastic element 202 is fastened to the middle frame 11, and the elastic element 202 can be deformed under an action of an external force.

In this case, the coil 211 in the actuator 201 is electrically connected to the first signal end S1 of the CPU. The first signal end S1 of the CPU may provide, in a time-division manner, the first drive signal and a second drive signal for the coil 211 in the actuator 201.

Alternatively, in some other embodiments of this application, the coil 211 in the actuator 201 is further electrically connected to a second signal end S2 (shown in FIG. 1) of the CPU, and the coil 211 in the actuator 201 is configured to receive the second drive signal provided by the second signal end S2.

It should be noted that the second drive signal may be a low-frequency signal, for example, a signal whose frequency is less than about 250 Hz. For example, when the mobile terminal 01 is a mobile phone, the second drive signal may be a vibration signal that is sent by a central processing unit (central processing unit, CPU) of the mobile phone to the coil 211 and that is triggered by a signal of an incoming call or a receiving message.

In this case, when the coil 211 receives the second drive signal, the actuator 201 vibrates at a large amplitude and a low frequency based on the second drive signal.

Because the elastic element 202 is connected to the actuator 201, when the actuator 201 vibrates at a large amplitude and a low frequency along a Z direction, the elastic element 202 can be deformed due to a force, and then vibrate with the actuator 201 along the Z direction.

Because the elastic element 202 is fastened to the middle frame 11, in a vibration process, the elastic element 202 can drive the middle frame 11 and the mobile terminal 01 that includes the display module 10 connected to the middle frame 11, the housing 12, and the like, to implement large and low-frequency vibration of the entire mobile terminal. In this case, vibration alert of the mobile phone may be implemented when there is an incoming call or an incoming message. In some embodiments of this application, the elastic element 202 may be a spring plate 222 shown in FIG. 20. The spring plate 222 is prone to be deformed under an action of an external force, and vibrates up and down along a Z direction. In this case, when the actuator 201 vibrates at a large amplitude and a low frequency, an acting force can be applied to the spring plate 222. The spring plate 222 is deformed under the acting force, and vibrates with the actuator 201.

To implement vibration of the entire mobile terminal, the following describes a structure of the mobile terminal 01 having the spring plate 222.

Example 5

Figure 20:
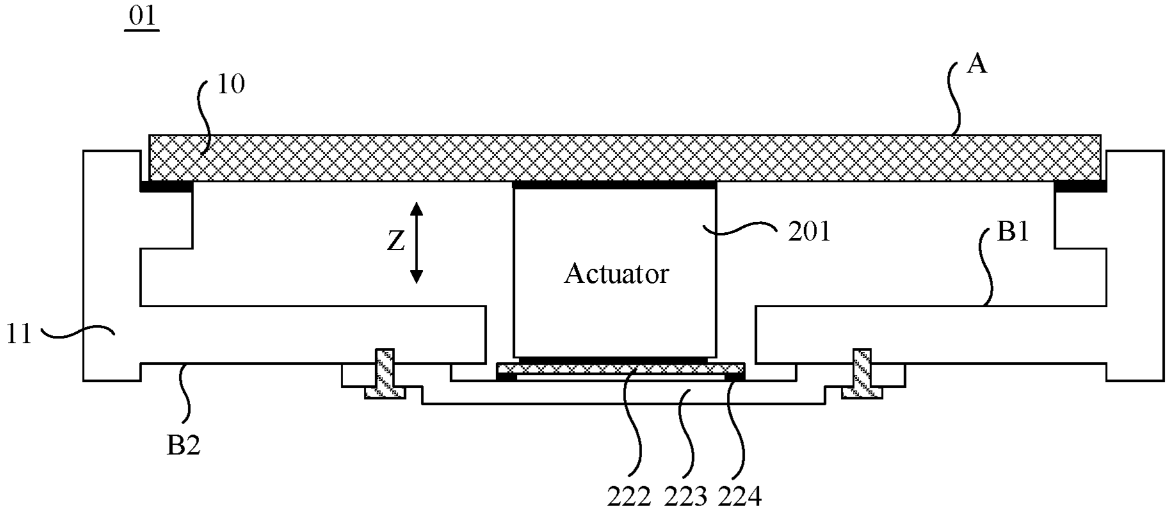
FIG. 20 is a schematic diagram of a structure of the elastic element in FIG. 19.

In this example, to make a spring plate 222 have some bounce space, as shown in FIG. 20, a hole is disposed on the middle frame 11, and when the mobile terminal 01 includes the support 223, the mobile terminal 01 further includes a support block 224. The spring plate 222 and the support block 224 are located in the hole on the middle frame 11.

Figure 21:
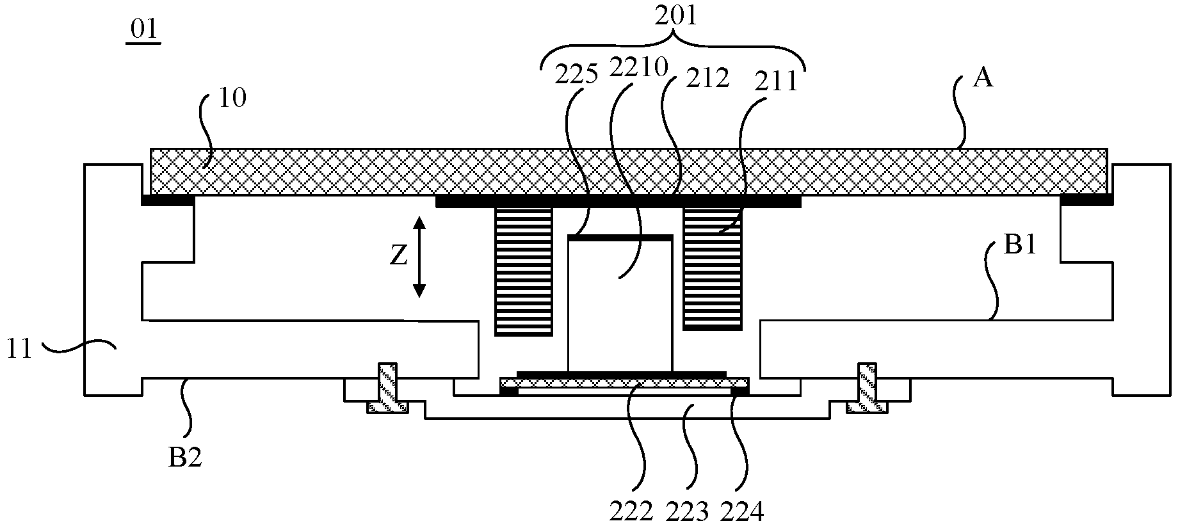
FIG. 21 is a schematic diagram of a disposing manner of an actuator and a spring plate in a mobile terminal shown in FIG. 20.
Figure 23:
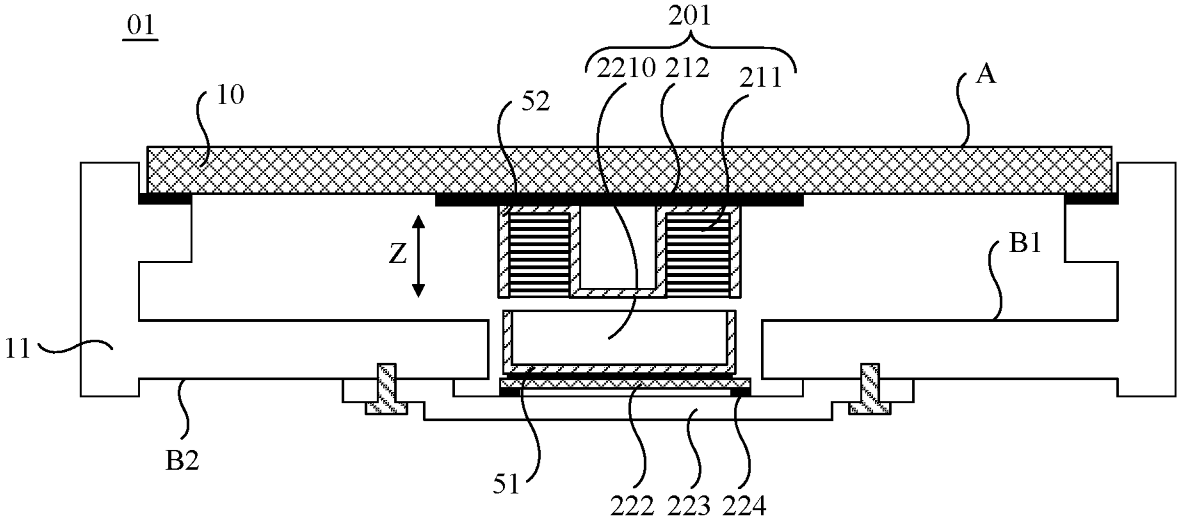
FIG. 23 is a schematic diagram of another disposing manner of the actuator and the spring plate in the mobile terminal shown in FIG. 20.
Figure 24:
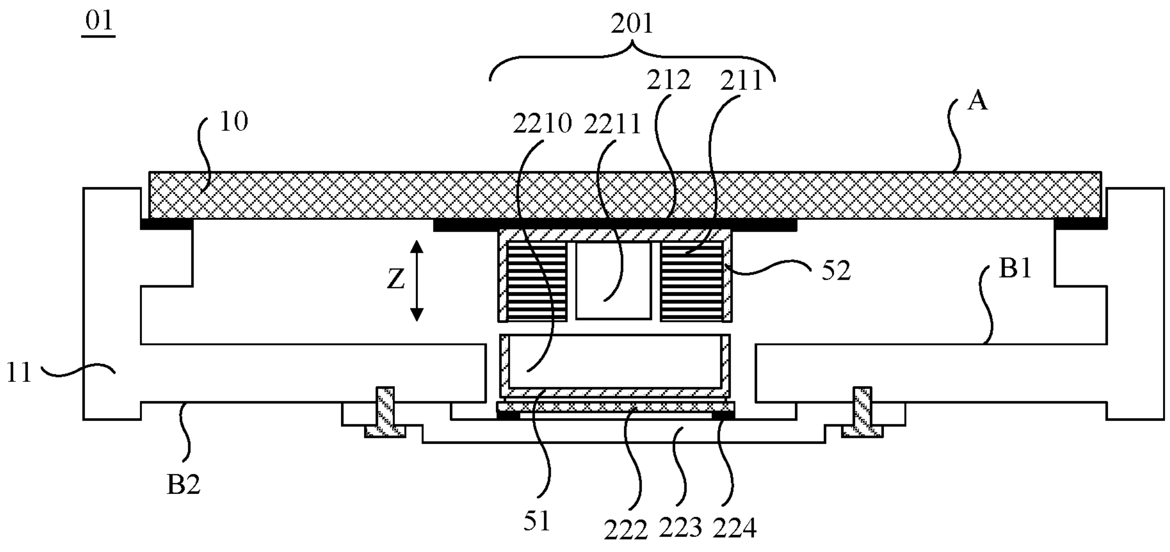
FIG. 24 is a schematic diagram of another disposing manner of the actuator and the spring plate in the mobile terminal shown in FIG. 20.

In this case, an example in which the second magnet 22 is a main magnet 2210 shown in FIG. 21, FIG. 21, FIG. 23, or FIG. 24 is used. The spring plate 222 is located between the second magnet 22 and the support 223, and the spring plate is connected to the second magnet. The spring plate may be directly connected to the second magnet, or may be indirectly connected to the second magnet. The following describes a disposing position of the spring plate 222.

For example, in some embodiments of this application, as shown in FIG. 21, the spring plate 222 is directly connected to a lower surface of the main magnet 2210 by using an adhesive layer (a black cover layer on an upper surface of the spring plate 222).

Figure 22:
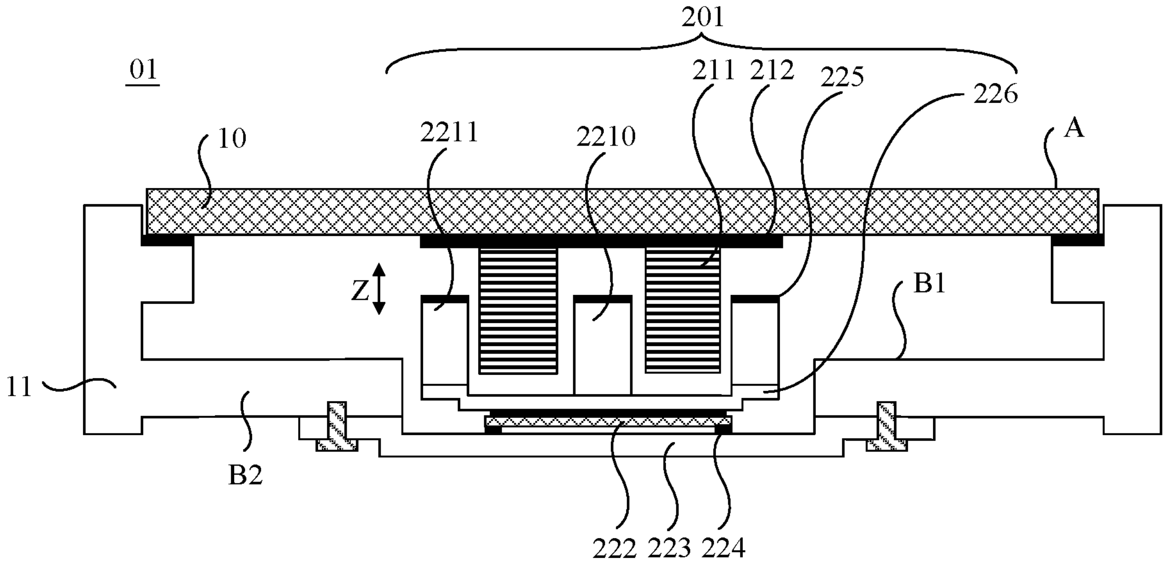
FIG. 22 is a schematic diagram of another disposing manner of the actuator and the spring plate in the mobile terminal shown in FIG. 20.

For another example, in some other embodiments of this application, as shown in FIG. 22, when the main magnet 2210 is located in a closed region wound by a wire of the coil 211, and the mobile terminal 01 further includes an auxiliary magnet 2211 located on a same side as the main magnet 2210, the main magnet 2210 and the auxiliary magnet 2211 may be disposed on the magnetic bowl 226. In this case, the spring plate 222 is connected to a lower surface of the magnetic bowl 226 by using an adhesive layer, in other words, the spring plate 222 is connected to the main magnet 2210 by using the magnetic bowl 226.

For still another example, in some other embodiments of this application, as shown in FIG. 23, in a case in which the main magnet 2210 and a coil 211 are disposed opposite to each other, and the main magnet 2210 is located outside a closed region wound by a wire of the coil 211, when the main magnet 2210 is located in a first magnetic shield 51, the spring plate 222 is connected to a lower surface of the first magnetic shield 51 by using an adhesive layer, in other words, the spring plate 222 is connected to the main magnet 2210 by using the first magnetic shield 51.

In addition, based on the structure shown in FIG. 23, when the mobile terminal further includes the auxiliary magnet 2211 shown in FIG. 24, because the auxiliary magnet 2211 is located on a same side as the coil 211, and is embedded in the closed region wound by the wire of the coil 211, the spring plate 222 is still connected, by using an adhesive layer, to the lower surface of the first magnetic shield 51 in which the main magnet 2210 is accommodated.

Figure 25:
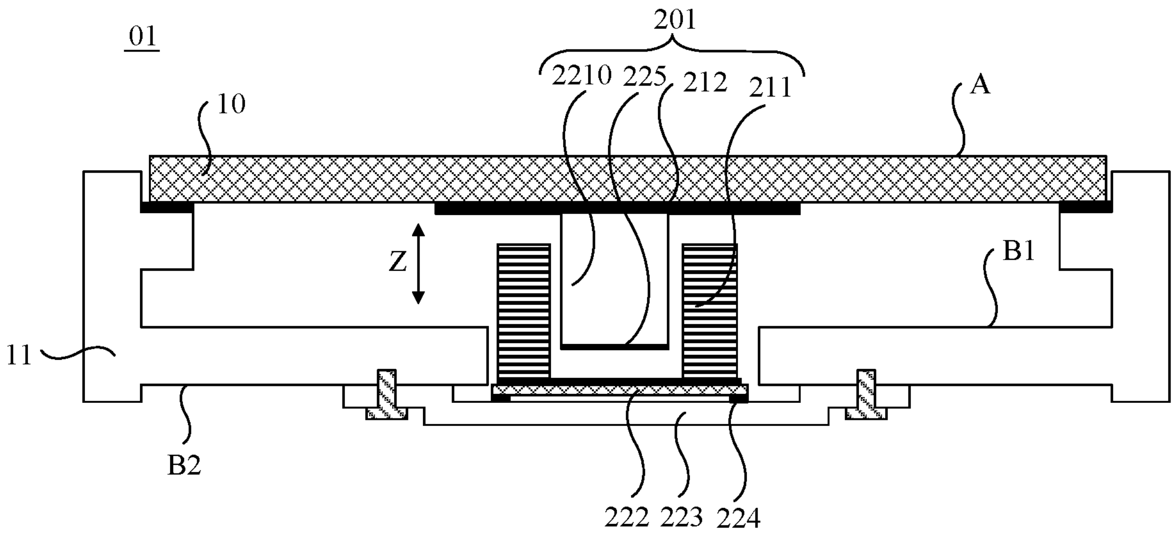
FIG. 25 is a schematic diagram of another disposing manner of the actuator and the spring plate in the mobile terminal shown in FIG. 20.
Figure 26:
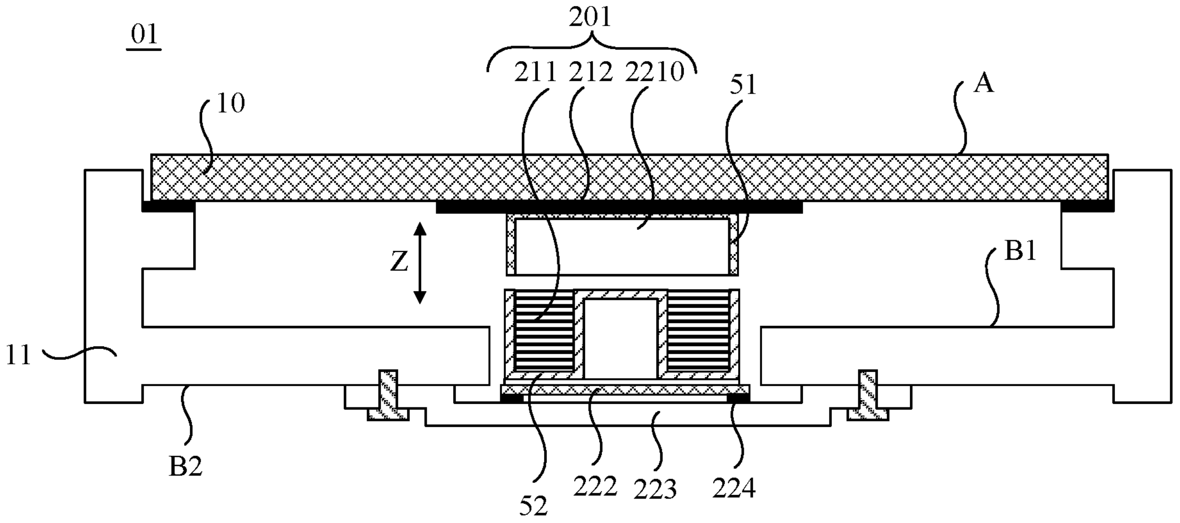
FIG. 26 is a schematic diagram of another disposing manner of the actuator and the spring plate in the mobile terminal shown in FIG. 20.

Alternatively, an example in which the second magnet 22 is a coil 211 shown in FIG. 25 or FIG. 26 is used to describe a disposing position of the spring plate 222.

For example, in some other embodiments of this application, as shown in FIG. 25, the spring plate 222 is directly connected to a lower surface of the coil 211 by using an adhesive layer.

For another example, in some other embodiments of this application, as shown in FIG. 26, in a case in which the main magnet 2210 and the coil 211 are disposed opposite to each other, and the main magnet 2210 is located outside a closed region wound by a wire of the coil 211, the spring plate 222 is connected, by using an adhesive layer, to a lower surface of a second magnetic shield 52 in which the coil 211 is accommodated, in other words, the spring plate 222 is connected to the coil 211 by using the second magnetic shield 52.

In addition, the support block 224 is disposed between the spring plate 222 and the support 223, and an upper surface and a lower surface of the support block 224 are respectively connected to the spring plate 222 and the support 223.

In this case, with the support of the support block 224, a specific gap may exist between the spring plate 222 and the support 223 when no external force is applied to the spring plate 222, and the gap may be used as bounce space in which the spring plate 222 is deformed under an external force. In addition, when the main magnet 2210 (or the coil 211) drives the spring plate 222 to vibrate in the bounce space, vibration of the spring plate 222 may be transferred to the middle frame 11 through the support 223.

Figure 27:
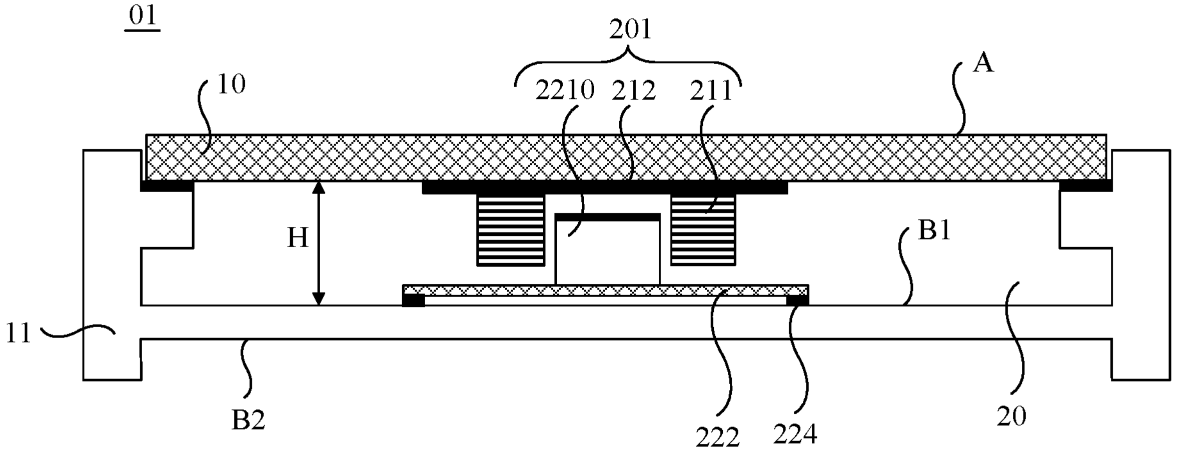
FIG. 27 is a schematic diagram of a disposing manner of the actuator and a spring plate in the mobile terminal shown in FIG. 19.

In addition, in this example, when a structure of the mobile terminal 01 is shown in FIG. 27, and the spring plate 222, the support block 224, the first magnet 21 (for example, the coil 211 in FIG. 27), the second magnet 22 (for example, the main magnet 2210 in FIG. 27), and the auxiliary magnet 2211 in the mobile terminal 01 are all located in the accommodating space 20, to make the spring plate 222 have some bounce space, the spring plate 222 may be located between the second magnet 22 and the middle frame 111, and the spring plate 222 may be connected to the second magnet 22 by using an adhesive layer.

In addition, the support block 224 is disposed between the spring plate 222 and the middle frame 11, and an upper surface and a lower surface of the support block 224 are respectively connected to the spring plate 222 and the middle frame 11.

In this case, with the support of the support block 224, a specific gap may exist between the spring plate 222 and the middle frame 11 when no external force is applied to the spring plate 222, and the gap may be used as bounce space in which the spring plate 222 is deformed under an external force. In addition, when the second magnet 22 (for example, the main magnet 2210 in FIG. 27) drives the spring plate 222 to vibrate in the bounce space, vibration of the spring plate 222 may be transferred to the middle frame 11.

It can be learned from the foregoing descriptions that the spring plate 222 can drive the middle frame 11 to vibrate, and drive, by using the middle frame 11, the entire mobile terminal 01 to vibrate. Therefore, the spring plate 222 may be used as a vibration system that drives the entire mobile terminal 01 to vibrate. In this case, an elastic coefficient of the spring plate 222 can affect a resonance frequency of the vibration system.

The elastic coefficient k, a mass m, and a resonance frequency f of the spring plate 222 satisfy Formula (1):

$$f = \frac{1}{2\pi} \times \sqrt{\frac{k}{m}} \quad (1)$$

In this case, when a material and a size of the selected spring plate 222 are different, the resonance frequency of the spring plate 222 changes, and the resonance frequency of the vibration system also changes.

Based on this, to make the vibration system have a good vibration effect, a frequency of the second drive signal needs to be the same as or approximately the same as the resonance frequency of the vibration system.

Figure 28:
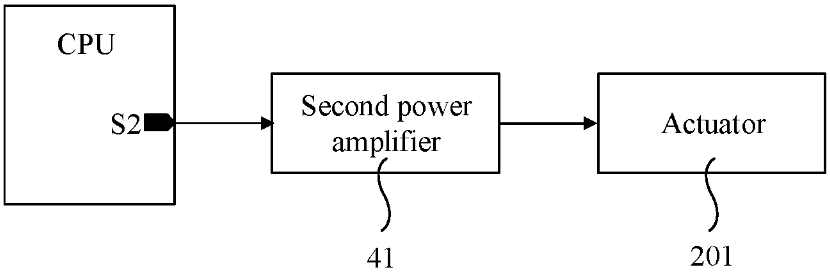
FIG. 28 is a schematic diagram of signal transmission for implementing entire-system vibration by the mobile terminal shown in FIG. 21.

In this case, the structure shown in FIG. 21 is used as an example to describe a process in which the mobile terminal 01 implements vibration of the entire mobile terminal. As shown in FIG. 28, the second drive signal provided by the second signal end S2 of the CPU is transmitted to the coil 211 in the actuator 201 after being processed by a second power amplifier 41. The second power amplifier 41 can amplify the second signal end S2, so that the coil 211 identifies an amplified second drive signal.

In this case, after the coil 211 receives the second drive signal (that is, a low-frequency signal), the coil 211 generates an alternating magnetic field under an action of the second drive signal.

As described above, the main magnet 2210 generates a constant magnetic field with constant strength and a constant direction.

The second drive signal is a low-frequency signal, and has a large difference from the resonance frequency of the sound system. Therefore, when the two magnetic fields interact with each other, the coil 211 in the sound system does not drive the display module 10 used as a diaphragm to vibrate at a high frequency, and consequently, the display module 10 cannot drive air to make sound. The sound system is in a non-working state.

In addition, the frequency of the second drive signal is close to the resonance frequency of the spring plate 222 used as the vibration system. Therefore, interaction between the magnetic field generated by the coil 211 and the magnetic field generated by the main magnet 2210 can drive the spring plate 222 to move up and down along a Z direction.

In this case, the spring plate 222 drives the middle frame 11 to vibrate by using the support 223. In addition, the display module 10 connected to the middle frame 11, the housing 12, and the like vibrate together at a low frequency and a large amplitude. In this case, the vibration system is in a working state, and the entire mobile terminal 01 vibrates. The vibration system may play a role of a motor, and may implement vibration alert of the mobile phone when there is an incoming call or an incoming message.

In this case, the spring plate 222 may implement a function of the motor, and the motor does not need to be separately disposed in the mobile terminal 01. Compared with the motor, the spring plate 222 has a smaller volume, thereby saving more architecture space. A component with another function, such as a front-facing camera, a rear-facing camera, or a fingerprint sensor, may be disposed in the architecture space. In this way, integration of functions of the mobile terminal 01 is improved.

In addition, the structure shown in FIG. 21 is used as an example to describe a process in which the mobile terminal 01 implements sound on display and vibration of the entire mobile terminal.

Figure 29:
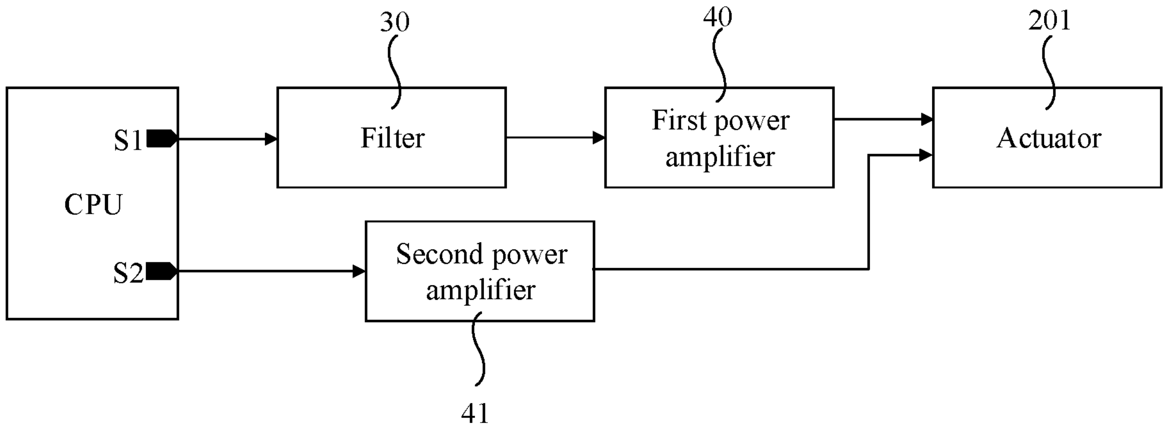
FIG. 29 is a schematic diagram of signal transmission for implementing sound on display and entire-system vibration by the mobile terminal shown in FIG. 21.

To implement a sound on display mode and a vibration mode of the entire mobile terminal 01, as shown in FIG. 29, the first drive signal provided by the first signal end S1 of the CPU is transmitted to the coil 211 in the actuator 201 after being processed by the filter 30 and the first power amplifier 40. In addition, the second drive signal provided by the second signal end S2 of the CPU is transmitted to the coil 211 after being processed by the second power amplifier 41.

In this case, the coil 211 in the actuator 201 may receive both the first drive signal (that is, an intermediate-frequency or high-frequency signal) and the second drive signal (that is, a low-frequency signal).

It should be noted that, when both the first drive signal and the second drive signal are input to the coil 211, a frequency of a superimposed signal received by the coil 211 is a sum of a frequency (for example, 1000 Hz) of the first drive signal and a frequency (for example, 100 Hz) of the second drive signal. In this case, a waveform of the superimposed signal is no longer a harmonic waveform.

In this case, the coil 211 generates an alternating magnetic field under an action of the superimposed signal. Under an action of the alternating magnetic field and the constant magnetic field generated by the main magnet 2210, the coil 211 is driven to drive the display module 10 to vibrate at a small amplitude and a high frequency along the Z direction. The display module 10 is used as a diaphragm to push air to generate sound in the vibration process, to implement sound on display. In this case, the sound system is in a working state.

In addition, under the action of the alternating magnetic field generated by the superimposed signal and the constant magnetic field generated by the main magnet 2210, the coil 211 drives the main magnet 2210 to drive the spring plate 222 to move up and down along the Z direction. In this case, the spring plate 222 drives the middle frame 11 to vibrate by using the support 223. In addition, the display module 10 connected to the middle frame 11, the housing 12, and the like vibrate together at a low frequency and a large amplitude. In this case, the vibration system is in a working state, and the entire mobile terminal 01 vibrates.

In conclusion, the resonance frequency of the sound system including the first magnet 21 (for example, the coil 211 shown in FIG. 21, or the main magnet 2210 shown in FIG. 25), the display module 10, and the foam adhesive 111 is far greater than the resonance frequency of the vibration system including the spring plate 222. Therefore, the spring plate 222 can work as a frequency divider. When the coil 211 receives an intermediate-frequency or high-frequency first drive signal, the first magnet 21 drives the display module 10 to vibrate, so that the sound system works, thereby implementing sound on display. When the coil 211 receives a low-frequency second drive signal, the second magnet 22 drives the spring plate 222 and the middle frame 11 connected to the spring plate 222 to vibrate, so that the vibration system works, thereby implementing vibration of the entire mobile terminal.

It should be noted that the foregoing describes, by using the mobile terminal 01 shown in FIG. 21 as an example, a process in which the mobile terminal 01 implements sound on display and vibration of the entire mobile terminal. FIG. 22, FIG. 23, FIG. 24, FIG. 25, FIG. 26, and FIG. 27 can also implement sound on display and entire-system vibration. Details are not described herein again.

A disposing manner of the actuator 201 and the spring plate 222 in the mobile terminal 01 provided in the embodiments of this application may use a structure described in any one of the foregoing examples.

Based on this, to improve uniformity of vibration of the display module 01 when the mobile terminal 01 makes sound by implementing sound on display, and/or uniformity of vibration of the entire mobile terminal when the entire mobile terminal 01 vibrates, the mobile terminal 01 may include at least two actuators 201.

Figure 30:
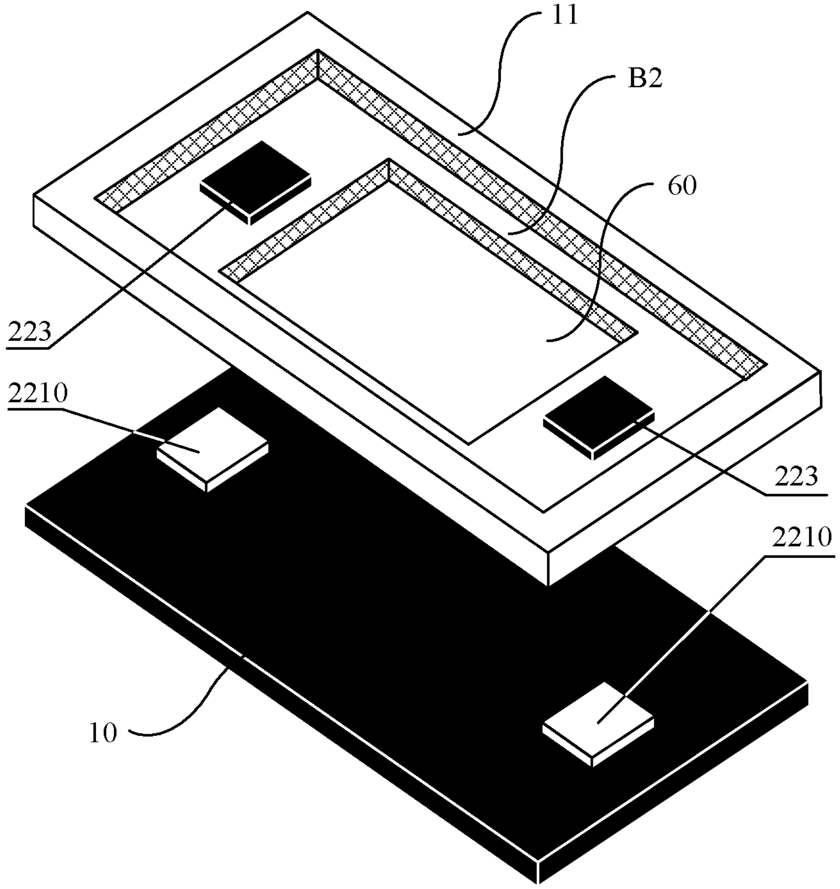
FIG. 30 is a schematic diagram of a disposing manner of a plurality of actuators in a mobile terminal according to an embodiment of this application.

As shown in FIG. 30, a groove 60 for embedding a battery is disposed in a middle position of the middle frame 11. In this case, the two actuators 201 are respectively located at an upper end and a lower end of the groove 60, and are disposed away from a clearance area of an antenna. A hole (not shown in the figure) for embedding the actuator 201 may be disposed on the middle frame 11, or the hole may not be disposed, and the two actuators 201 are directly disposed on the middle frame 11.

For example, the hole for embedding the actuator 201 may be disposed on the middle frame 11. When the mobile terminal 01 can implement sound on display, the first magnet 21 in the actuator 201 may be disposed on a back facet of the display module 10, and is directly opposite to a position of the hole disposed on the middle frame 11. In addition, a part of the second magnet 22 in the actuator 201 is located in the hole, and is fastened to the support 223. The support 223 is fastened to the second surface B2 of the middle frame 11 by using screws.

Alternatively, when the mobile terminal 01 can implement sound on display and vibration of the entire mobile terminal, as shown in FIG. 30, the first magnet 21 in the actuator 201, for example, the main magnet 2210 shown in FIG. 7, may be disposed on the display module 10, and is directly opposite to a position of the hole disposed on the middle frame 11. In addition, the second magnet 22 in the actuator 201, for example, a part of the coil 211 shown in FIG. 7, and the spring plate 222 are located in the hole, and are fastened to the support 223. The support 223 is fastened to the second surface B2 of the middle frame 11 by using screws.

It can be learned from the foregoing descriptions that the main magnet 2210 is disposed on the display module 10, and the coil 211 is disposed on the middle frame 11. This can avoid a problem that a display effect of the display module 10 is reduced because the coil 211 is heated. In addition, a manner of an electrical connection between the coil 211 and the CPU can be further simplified, and reliability of the electrical connection between the coil 211 and the CPU can be improved.

Alternatively, the first magnet 21 in the actuator 201, for example, the coil 211 shown in FIG. 6, is disposed on the display module 10, and is directly opposite to a position of the hole disposed on the middle frame 11. In addition, the second magnet 22 in the actuator 201, for example, a part of the main magnet 2210 shown in FIG. 6, and the spring plate 222 are located in the hole, and are fastened to the support 223. The support 223 is fastened to the second surface B2 of the middle frame 11 by using screws.

Descriptions are provided above by using an example in which the mobile terminal 01 includes two actuators 201. When the mobile terminal 01 includes one actuator 201, the actuator 201 may be disposed on an upper side of the mobile terminal 01. In other words, when a user answers a call, the actuator 201 can be located near an ear of the user. In this way, when the mobile terminal 01 implements sound on display by using the actuator 201, in a process in which the user answers the mobile phone, an effect of sound on display in a position of an ear is better, and a voice signal is clearer.

Example 1 to Example 5 are all described by using an example in which the main magnet 2210 is a single magnet. The main magnet 2210 in Example 1 to Example 5 may alternatively be a magnet structure formed in a magnet array arrangement manner, for example, a Halbach array. When the main magnet 2210 uses a Halbach array, a strong magnetic field is generated on a side that is of the main magnet 2210 and that is close to the coil. For a specific implementation thereof, refer to Example 6 to Example 10.

Example 6

Figure 31:
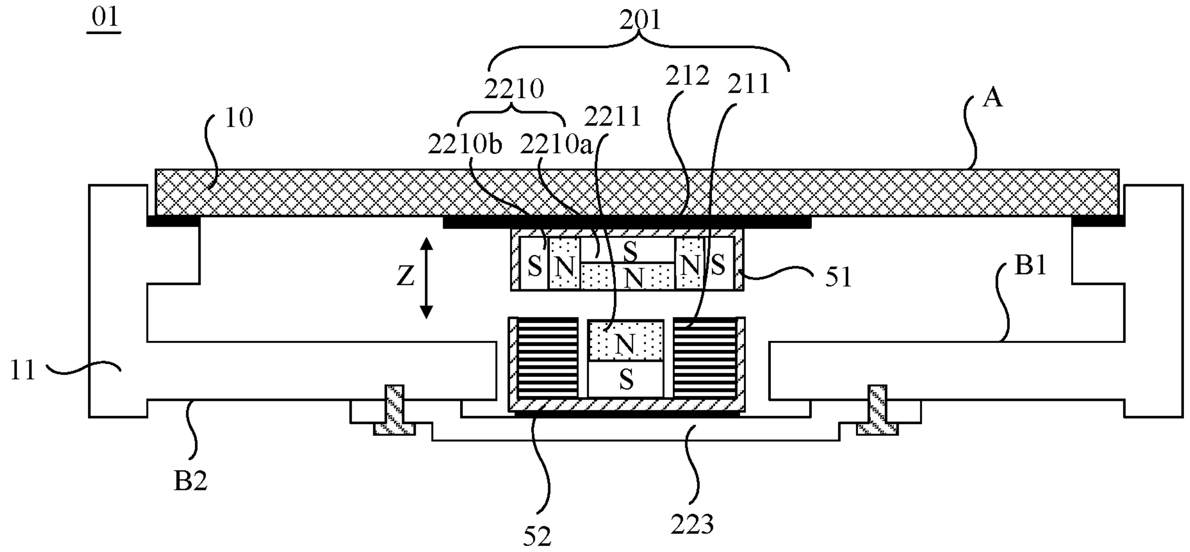
FIG. 31 is a schematic diagram of a magnetic pole setting manner of the first magnet and the second magnet in the mobile terminal shown in FIG. 17.

In this example, as shown in FIG. 31, the first magnet 21 is a main magnet 2210, and the second magnet 22 is a coil 211.

The main magnet 2210 is located outside a closed region wound by a wire of the coil 211. Opposite surfaces of the main magnet 2210 and the coil 211 are parallel. The coil 211 may be of an annular structure, for example, a circular coil or a square-ring coil. For a specific structure, refer to Example 3.

This example differs from Example 4 in that the main magnet 2210 uses a Halbach array (halbach array).

The Halbach array is a new permanent magnet arrangement manner and is an approximately ideal structure in engineering. An objective is to generate a strongest magnetic field with fewest magnets. By arranging permanent magnets in different magnetization directions in a specific order (for example, by arranging the magnets in a radial and parallel manner), if an end effect is ignored and magnetic conductivity of a surrounding magnetic conductive material is considered infinite, a unilateral magnetic field may be finally formed by the foregoing permanent magnet structure, in other words, a magnetic field on one side of the array is significantly enhanced, and a magnetic field on the other side is significantly weakened.

It should be noted that, in this embodiment of this application, the unilateral magnetic field formed by the Halbach array should be understood as a strong magnetic field formed by the Halbach array on the side.

Figure 32:
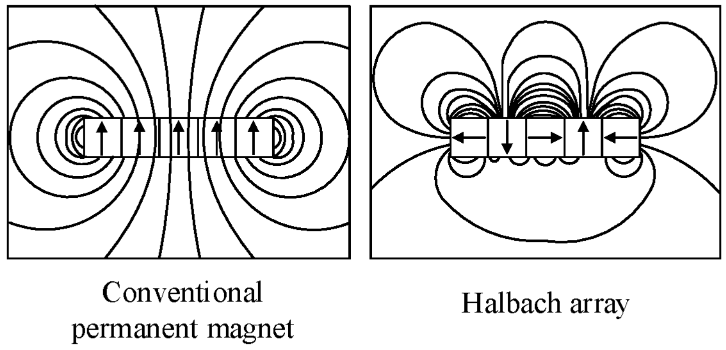
FIG. 32 is a schematic diagram of spatial magnetic field distribution of a conventional permanent magnet and a Halbach array.

FIG. 32 schematically shows spatial magnetic field distribution of a conventional permanent magnet and a Halbach array. An arrow in FIG. 32 represents a magnetic field direction inside a magnet (that is, from an S pole to an N pole). A left figure shows spatial magnetic field distribution of the conventional permanent magnet. It can be learned from the figure that there are magnetic fields of same strength around the conventional permanent magnet. A right figure shows spatial magnetic field distribution of the Halbach array. It can be learned from the figure that magnetic field strength on one side of a Halbach array formed in an arrangement manner in the figure is significantly improved, and magnetic field strength on the other side is significantly reduced. It should be understood that the spatial magnetic field distribution of the Halbach array shown in FIG. 32 is merely an example for describing the unilateral magnetic field generated by the Halbach array, and does not impose any limitation on this embodiment of this application.

Figure 33:
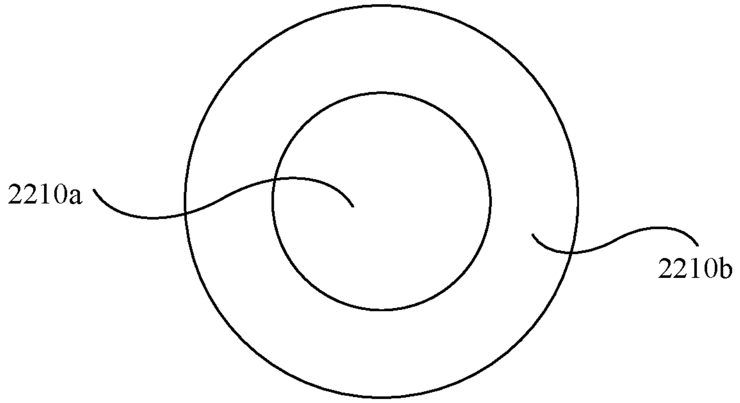
FIG. 33 is a schematic diagram of a structure of a Halbach array according to an embodiment of this application.

In this embodiment of this application, a structure of the Halbach array used by the main magnet 2210 may be shown in FIG. 33. The main magnet 2210 includes a first main magnet part 2210*a* and a second main magnet part 2210*b*. The first main magnet part 2210*a* may be circular or oval, and is used as a central magnet part of the main magnet 2210, and the second main magnet part 2210*b* may be circular or oval, and is used as a peripheral magnet part of the main magnet 2210.

In some other embodiments, the first main magnet part 2210*a* may be in another shape, for example, a triangle, a square, a polygon, or another regular or irregular shape, and the second main magnet part 2210*b* may be in another shape, for example, a hollow triangle, a hollow square, a hollow polygon, or another regular or irregular shape. It should be understood that a shape of the second main magnet part 2210*b* matches a shape of the first main magnet part 2210*a*, so that the Halbach array is formed after the first main magnet part 2210*a* and the second main magnet part 2210*b* are arranged.

FIG. 31 further shows a magnetic pole setting manner of the first magnet 21 and the second magnet 22. As shown in FIG. 31, the main magnet 2210 and an auxiliary magnet 2211 are disposed opposite to each other. An end that is of the first main magnet part 2210*a* included in the main magnet 2210 and that is close to the auxiliary magnet 2211 (in other words, close to the middle frame 11) is set to an N pole, and an end that is of the first main magnet part 2210*a* and that is away from the auxiliary magnet 2211 (in other words, close to the display module 10) is set to an S pole. In other words, the N pole and the S pole of the first main magnet part 2210*a* are set in a Z direction (namely, an up-down direction on a paper surface). An end that is of the second main magnet part 2210*b* included in the main magnet 2210 and that is closed to the first main magnet part 2210*a* is set to an N pole, and an end that is of the second main magnet part 2210*b* and that is away from the first main magnet part 2210*a* (in other words, close to a first magnetic shield 51) is set to an S pole. In other words, the N pole and the S pole of the second main magnet part 2210*b* are set in a direction perpendicular to the Z direction on the paper surface (namely, a left-right direction on the paper surface), and the setting direction is perpendicular to the setting direction of the N pole and the S south of the first main magnet part 2210*a*. For magnetic field distribution of a Halbach array formed in the foregoing magnetic pole setting manner, refer to a magnetic field formed in an arrangement manner of three left magnets or three right magnets in the right figure in FIG. 32. To enable the actuator 201 to be in a balanced state in a non-working state, when the first magnet 21 (for example, the main magnet 2210 shown in FIG. 31) uses the foregoing magnetic pole setting manner, an end that is of the auxiliary magnet 2211 and that is close to the main magnet 2210 (in other words, close to the display module 10) is set to an N pole, and an end that is of the auxiliary magnet 2211 and that is away from the main magnet 2210 (in other words, close to the middle frame 11) is set to an S pole.

Figure 34:
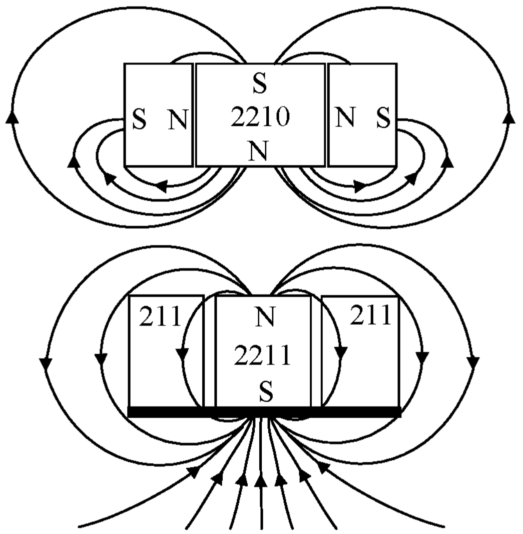
FIG. 34 is a schematic diagram of interaction between a magnetic field generated by a main magnet and a magnetic field generated by an auxiliary magnet shown in FIG. 31.

In this case, when the actuator 201 is in the non-working state, no current is applied to the coil 211, and a schematic diagram of interaction between a magnetic field generated by the main magnet 2210 and a magnetic field generated by the auxiliary magnet 2211 may be shown in FIG. 34. The magnetic field generated by the Halbach array of the main magnet 2210 and the magnetic field generated by the auxiliary magnet 2211 may generate a repulsive force. Similar to the case in Example 4, the first magnetic shield 51 wrapping the main magnet 2210 (including the first main magnet part 2210*a* and the second main magnet part 2210*b*) is magnetized by the main magnet 2210 and is magnetic, and a second magnetic shield 52 wrapping the auxiliary magnet 2211 is magnetized by the auxiliary magnet 2211 and is magnetic. Under interaction of magnetic fields generated by the main magnet 2210, the auxiliary magnet 2211, the first magnetic shield 51, and the second magnetic shield 52, the first magnet 21 (for example, the main magnet 2210 shown in FIG. 31) and the second magnet 22 (for example, the coil 211 shown in FIG. 31) may be in a balanced state. In this way, the display module 10 can keep balanced, and connection reliability between the first magnet 21 and the display module 10 can be improved. For example, the display module 10 is prevented from being pulled by the first magnet 21 and deformed, or the first magnet 21 is prevented from being separated from the display module 10. An interaction relationship between the auxiliary magnet 2211 and the main magnet 2210 using the Halbach array and beneficial effects in this example are similar to an interaction relationship between the auxiliary magnet 2211 and the main magnet 2210 using a single magnet and effects in Example 4. For details, refer to the foregoing descriptions. Details are not described herein again.

Figure 35:
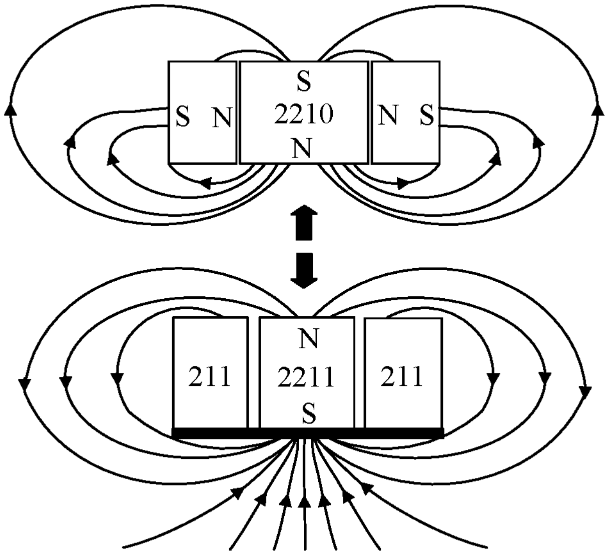
FIG. 35 is a schematic diagram of interaction between magnetic fields generated by a coil, the main magnet, and the auxiliary magnet shown in FIG. 31.

In this case, when the actuator 201 is in a working state, a current is applied to the coil 211, and a schematic diagram of interaction between a magnetic field generated by the coil 211, a magnetic field generated by the main magnet 2210, and a magnetic field generated by the auxiliary magnet 2211 may be shown in FIG. 35. The magnetic field generated by the coil 211 and the magnetic field generated by the main magnet 2210 may generate a repulsive force, and the magnetic field generated by the auxiliary magnet 2211 and the magnetic field generated by the main magnet 2210 also generate a repulsive force. Under interaction of the three magnetic fields, the first magnet 21 (for example, the main magnet 2210 shown in FIG. 31) may move away from the second magnet 22 (for example, the coil 211 shown in FIG. 31) relative to the second magnet 22.

Figure 36:
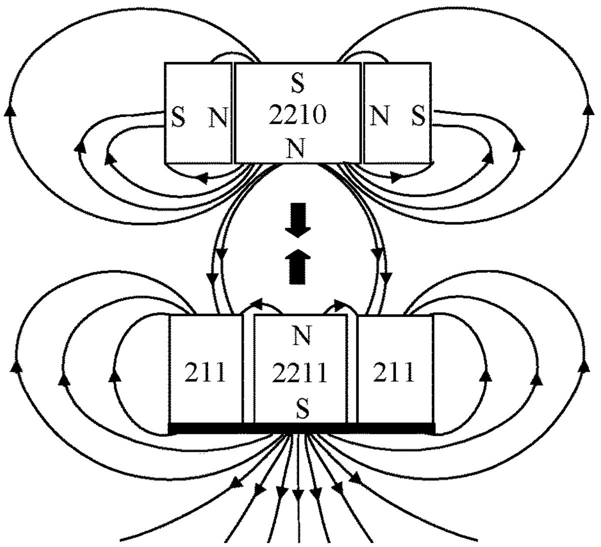
FIG. 36 is another schematic diagram of interaction between the magnetic fields generated by the coil, the main magnet, and the auxiliary magnet shown in FIG. 31.

Alternatively, after a direction of a current applied to the coil 211 changes, a schematic diagram of interaction between a magnetic field generated by the coil 211, a magnetic field generated by the main magnet 2210, and a magnetic field generated by the auxiliary magnet 2211 may be shown in FIG. 36. The magnetic field generated by the coil 211 and the magnetic field generated by the main magnet 2210 may generate an attraction force. Although the magnetic field generated by the auxiliary magnet 2211 and the magnetic field generated by the main magnet 2210 generate a repulsive force, under interaction of the three magnetic fields, the first magnet 21 (for example, the main magnet 2210 shown in FIG. 31) may move close to the second magnet 22 (for example, the coil 211 shown in FIG. 31) relative to the second magnet 22.

It should be understood that the schematic diagrams of interaction between magnetic fields shown in FIG. 35 and FIG. 36 should be understood as a result of combined action of the magnetic field generated by the coil 211, the magnetic field generated by the main magnet 2210, and the magnetic field generated by the auxiliary magnet 2211 after the coil 211 is powered on.

When the actuator 201 is in the working state, the coil 211 receives the foregoing first drive signal. Under combined action of the magnetic field generated by the coil 211, the magnetic field generated by the main magnet 2210, and the magnetic field generated by the auxiliary magnet 2211, the coil 211 and the main magnet 2210 can attract or repel each other, so that the first magnet 21 (for example, the main magnet 2210 shown in FIG. 31) vibrates at a small amplitude and a high frequency along the Z direction relative to the second magnet 22 (for example, the coil 211 shown in FIG. 31). In this way, the first magnet 21 drives the display module 10 to vibrate at a small amplitude and a high frequency, to implement sound on display.

It should be noted that when the actuator 201 is in the non-working state, no current is applied to the coil 211, and there may be a repulsive force (or an attraction force) that does not exceed a preset value between the first magnet 21 and the second magnet 22. When the actuator 201 is in the working state, a current is applied to the coil 211, there may be always a repulsive force (or an attraction force) between the first magnet 21 and the second magnet 22. However, because a magnitude and a direction of the applied current change, a magnitude of the repulsive force (or the attraction force) between the first magnet 21 and the second magnet 22 may change. When the repulsive force between the first magnet 21 and the second magnet 22 is large (or the attraction force between the first magnet 21 and the second magnet 22 is small), a distance between the first magnet 21 and the second magnet 22 is long. When the repulsive force between the first magnet 21 and the second magnet 22 is small (or the attraction force between the first magnet 21 and the second magnet 22 is large), a distance between the first magnet 21 and the second magnet 22 is short. In this way, as the current changes, the distance between the first magnet 21 and the second magnet 22 also changes, so that the first magnet 21 vibrates at a small amplitude and a high frequency along the Z direction relative to the second magnet 22. The first magnet 21 drives the display module 10 to vibrate at a small amplitude and a high frequency, to implement sound on display. In this case, that a distance between the first magnet 21 and the second magnet 22 is shorter (or longer) than a previous distance between the two may also equivalently mean that the first magnet 21 and the second magnet 22 attract (repel) each other.

In an embodiment of this application, because the main magnet 2210 uses the Halbach array, the main magnet generates a unilateral magnetic field on a side opposite to the coil, so that magnetic field strength on a side that is of the main magnet 2210 and that is close to the coil 211 is significantly improved, and magnetic field strength on a side that is of the main magnet 2210 and that is close to the display module 10 is significantly reduced. In this way, when the magnetic field generated by the coil 211 interacts with the magnetic field generated by the main magnet 2210 after the coil 211 is powered on, magnetic forces exerted on the main magnet 2210 and the coil 211 are significantly increased, so that vibration intensity of the coil 211 or vibration intensity of the main magnet 2210 can be improved.

Based on this, the first magnetic shield 51 and the second magnetic shield 52 are made of a magnetic conductive material, so as to reduce diffusion of a magnetic line in the magnetic fields generated by the main magnet 2210 and the coil 211, thereby reducing magnetic resistance. In this way, the magnetic field is leaked to the outside to a small extent, and action of the magnetic field generated by the coil 211 and the magnetic field generated by the main magnet 2210 is further improved, so that vibration intensity of the coil 211 or vibration intensity of the main magnet 2210 is further improved.

In addition, in an embodiment of this application, because the main magnet 2210 uses the Halbach array, magnetic field strength on one side of the array can be significantly improved. While same performance in Example 4 is achieved (for example, the main magnet 2210 has same vibration intensity), the main magnet 2210 and/or the auxiliary magnet 2211 may be thinner, or a quantity of turns of the coil 211 may be smaller, so that thickness space of the actuator 201 can be reduced, thereby reducing a thickness of the mobile terminal.

In addition, in some embodiments of this application, setting of magnetic poles of the main magnet 2210 and the auxiliary magnet 2211 in FIG. 31 may be completely reversed. To be specific, in the main magnet 2210, the ends that are of the first main magnet part **2210*a* and the second main magnet part 2210*b* and that are set to N poles are changed to S poles, and the ends that are of the first main magnet part 2210*a* and the second main magnet part 2210*b* and that are set to S poles are changed to N poles. In addition, the end that is of the auxiliary magnet 2211 and that is set to the N pole is changed to the S pole, and the end that is of the auxiliary magnet 2211 and that is set to the S pole is changed to the N pole. In this case, the main magnet 2210 is still a Halbach array, magnetic field strength on a side that is of the Halbach array and that is close to the coil 211 is significantly improved, and magnetic field strength on a side that is of the Halbach array and that is close to the display module 10** is significantly reduced. A process in which a mobile terminal having this structure implements sound on display is the same as that described above. Details are not described herein again.

In addition, in some embodiments of this application, positions of the main magnet 2210, the coil 211, and the auxiliary magnet 2211 in FIG. 31 may be alternatively reversed, and magnetic poles of the Halbach array used by the main magnet 2210 do not need to be reversed. In other words, the first magnet 21 is the coil 211, and the second magnet 22 is the main magnet 2210. In this case, the coil 211 and the auxiliary magnet 2211 are fastened to the back facet of the display module 10, and the main magnet 2210 passes through a hole on the middle frame 11, and is fastened to an upper surface of a support 223. A process in which a mobile terminal having this structure implements sound on display is the same as that described above. Details are not described herein again. It should be understood that, that the positions of the main magnet 2210, the coil 211, and the auxiliary magnet 2211 are reversed in this embodiment of this application means that the main magnet 2210 is fastened to the upper surface of the support 223 after an upper facet and a lower facet of the main magnet 2210 are reversed and the coil 211 and the auxiliary magnet 2211 are fastened to the back facet of the display module 10 after the coil 211 and the auxiliary magnet 2211 are flipped up and down. Taking the main magnet 2210 as an example, a surface that is of the main magnet 2210 and that is in contact with the upper surface of the support 223 after the position of the main magnet 2210 is reversed is the same as a surface that is of the main magnet 2210 and that is in contact with the back facet of the display module 10 before the reversal, so that it can be ensured that after the position reversal, a strong magnetic field is formed on a side that is of the main magnet 2210 and that is close to the auxiliary magnet 2211 and the coil 211. In other words, that the positions of the main magnet 2210, the coil 211, and the auxiliary magnet 2211 are reversed equivalently means that when positions of the display module 10 and the middle frame 11 are unchanged, the main magnet 2210, the coil 211, and the auxiliary magnet 2211 rotate 180 degrees along an axis perpendicular to the paper surface. This understanding is also applicable to other embodiments in which the main magnet 2210 uses the Halbach array. In addition, in an example in which opposite sides of the main magnet 2210 and the auxiliary magnet 2211 are set to a same pole, that the positions of the main magnet 2210, the coil 211, and the auxiliary magnet 2211 are reversed equivalently means that when the positions of the display module 10 and the middle frame 11 are unchanged, the main magnet 2210, the coil 211, the auxiliary magnet 2211 rotate 180 degrees along the axis perpendicular to the paper surface, so that it is ensured that opposite sides of the main magnet 2210 and the auxiliary magnet 2211 are still a same pole after the position reversal, and a polarity of opposite sides of the main magnet 2210 and the auxiliary magnet 2211 before the position reversal is the same as a polarity of the opposite sides of the main magnet 2210 and the auxiliary magnet 2211 after the position reversal, for example, the opposite sides are N poles.

In an embodiment of this application, a strong magnetic field is generated on the side that is of the main magnet 2210 and that is close to the coil 211, and a weak magnetic field is generated on the side that is of the main magnet 2210 and that is close to the display module 10. In some other embodiments of this application, magnetic poles of the first main magnet part 2210*a* included in the main magnet 2210 may be reversed and magnetic poles of the second main magnet part 2210*b* are unchanged, or magnetic poles of the second main magnet part 2210*b* are reversed and magnetic poles of the first main magnet part 2210*a* are unchanged. A direction of a unilateral magnetic field generated by a Halbach array formed in this way is reversed, in other words, a weak magnetic field is generated on a side on which a strong magnetic field is originally generated, and a strong magnetic field is generated on a side on which a weak magnetic field is originally generated. Such a Halbach array may be disposed on the middle frame 11 as the second magnet, to ensure that a strong magnetic field is generated on a side that is of the second magnet and that is close to the coil.

In an embodiment of this application, an example in which the main magnet 2210 using the Halbach array includes two permanent magnets (namely, the first main magnet part 2210*a* and the second main magnet part 2210*b*) in different magnetization directions is described. In some embodiments of this application, the main magnet 2210 using the Halbach array may alternatively include another quantity of permanent magnets, for example, three, four, or more permanent magnets, in different magnetization directions.

Figure 37:
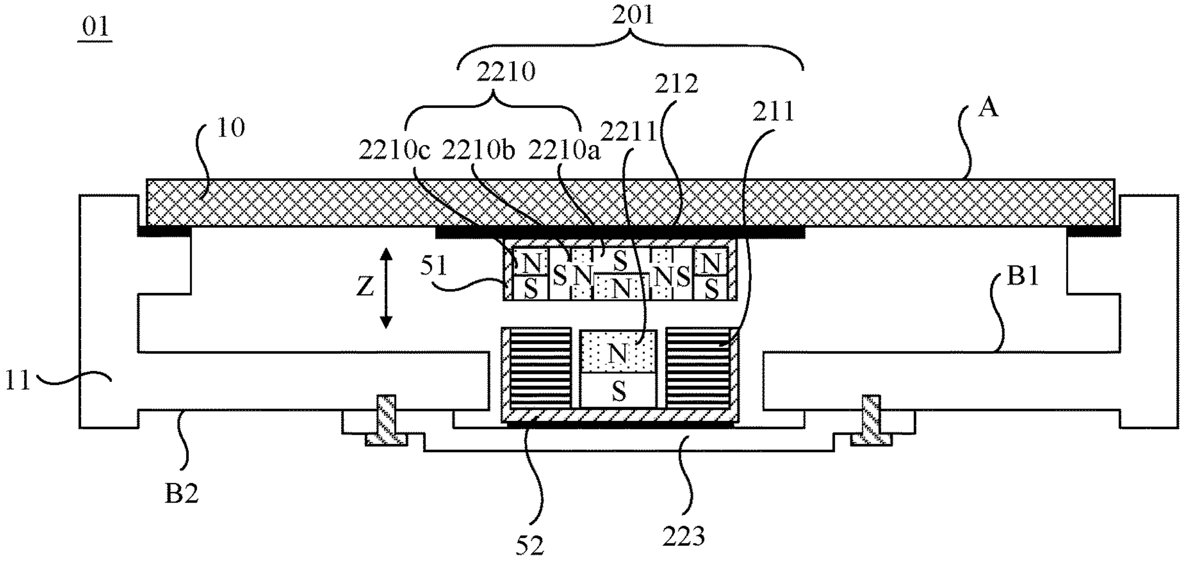
FIG. 37 is a schematic diagram of another magnetic pole setting manner of the first magnet and the second magnet in the mobile terminal shown in FIG. 17.

For example, a structure of the Halbach array used by the main magnet 2210 in FIG. 31 may be alternatively shown in FIG. 37. The main magnet 2210 includes a first main magnet part 2210*a*, a second main magnet part 2210*b*, and a third main magnet part 2210*c*. The first main magnet part 2210*a* may be circular or oval, and is used as a central magnet part of the main magnet 2210, and the second main magnet part 2210*b* and the third main magnet part 2210*c* may be circular or oval, and are used as a peripheral magnet part of the main magnet 2210. It should be understood that the first main magnet part 2210*a*, the second main magnet part 2210*b*, and the third main magnet part 2210*c* may be in another shape, for example, a triangle, a square, a polygon, or another regular or irregular shape, provided that a shape of the second main magnet part 2210*b* matches a shape of the first main magnet part 2210*a* and a shape of the third main magnet part 2210*c* matches the shape of the second main magnet part 2210*b*, so that the Halbach array is formed after the first main magnet part 2210*a*, the second main magnet part 2210*b*, and the third main magnet part 2210*c* are arranged.

FIG. 37 further shows a magnetic pole setting manner of the first magnet 21 and the second magnet 22. As shown in FIG. 37, the main magnet 2210 and the auxiliary magnet 2211 are disposed opposite to each other. A magnetic pole setting manner of the first main magnet part 2210*a* and the second main magnet part 2210*b* included in the main magnet 2210 is the same as the magnetic pole setting manner of the first main magnet part 2210*a* and the second main magnet part 2210*b* in FIG. 31. For details, refer to FIG. 37, FIG. 31, and the foregoing related descriptions. An end that is of the third main magnet part 2210*c* included in the main magnet 2210 and that is close to the auxiliary magnet 2211 is set to an S pole, and an end that is of the third main magnet part 2210*c* and that is away from the auxiliary magnet 2211 (in other words, close to the display module 10) is set to an N pole. In other words, the N pole and the S pole of the third main magnet part 2210*c* are set in the Z direction (namely, the up-down direction of the paper surface). To enable the actuator 201 to be in a balanced state in the non-working state, when the first magnet 21 (for example, the main magnet 2210 shown in FIG. 37) uses the foregoing magnetic pole setting manner, an end that is of the auxiliary magnet 2211 and that is close to the main magnet is set to an N pole, and an end that is of the auxiliary magnet 2211 and that is away from the main magnet 2210 (in other words, close to the middle frame 11) is set to an S pole. An effect that can be achieved by the main magnet 2210 using the Halbach array shown in FIG. 37 is similar to the effect that can be achieved by the main magnet 2210 using the Halbach array shown in FIG. 31. For details, refer to the foregoing descriptions. A process of implementing sound on display by the mobile terminal having this structure is also described above, and details are not described herein again.

In addition, in some embodiments of this application, setting of magnetic poles of the main magnet 2210 and the auxiliary magnet 2211 in FIG. 37 may be completely reversed (that is, each N pole is changed to an S pole, and each S pole is changed to an N pole). In this way, a strong magnet field is still formed on the side that is of the main magnet 2210 and that is close to the coil 211. In some other embodiments of this application, positions of the main magnet 2210, the coil 211, and the auxiliary magnet 2211 in FIG. 37 may be reversed. An implementation of the position reversal is the same as the foregoing descriptions. For details, refer to the foregoing related descriptions. Details are not described herein again.

It should be understood that, based on an actual requirement for a magnetic field and a condition of mounting space of the actuator 201, the Halbach array in this embodiment of this application may use different arrangement manners, for example, a linear array, an annular array, and an array formed in another arrangement manner. This is not specially limited in this embodiment of this application.

Example 7

As mentioned above, the magnetic field generated by the Halbach array is a unilateral magnetic field, magnetic field strength on one side of the array is significantly improved, and magnetic field strength on the other side of the array is significantly reduced. In a mobile terminal shown in FIG. 31 or FIG. 37, when the main magnet 2210 uses the Halbach array, a strong magnetic field is generated between the main magnet 2210 and the coil 211. Correspondingly, magnetic field strength on a side that is of the main magnet 2210 and that is close to the display module 10 is quite weak. In this case, a magnetic field generated by the main magnet 2210 causes quite small interference to a peripheral component. Therefore, a thinner first magnetic shield 51 may be used to implement a magnetic conduction effect that is the same as or even better than that of the first magnetic shield 51 in Example 6, or a first magnetic shield 51 may be directly omitted.

Figure 38:
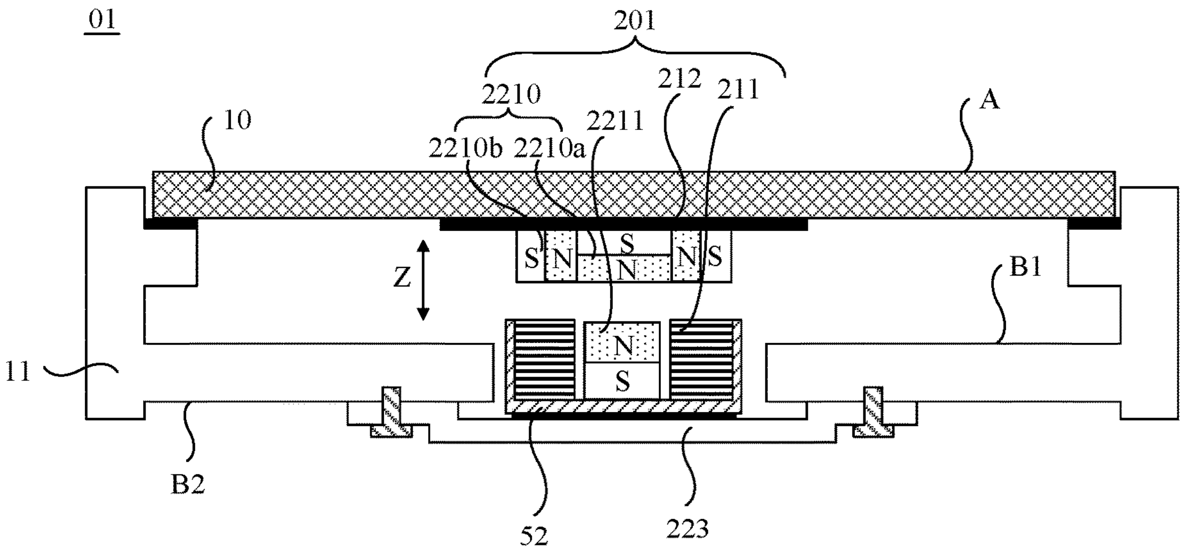
FIG. 38 is a schematic diagram of another structure of the first magnet and the second magnet in the mobile terminal shown in FIG. 5.

In this example, as shown in FIG. 38, the first magnet 21 is the main magnet 2210, and the second magnet 22 is the coil 211.

The main magnet 2210 is located outside a closed region wound by a wire of the coil 211. Opposite surfaces of the main magnet 2210 and the coil 211 are parallel. The coil 211 may be of an annular structure, for example, a circular coil or a square-ring coil. For a specific structure, refer to Example 3.

A difference from Example 6 lies in that the mobile terminal does not include the first magnetic shield 51 that has a magnetic shielding function on the magnetic field generated by the main magnet 2210, but still retains a second magnetic shield 52 that has a magnetic shielding function on a magnetic field generated by the coil 211.

In this case, because the first magnetic shield 51 is omitted, the main magnet 2210 may be directly fastened to a lower surface of a support plate 212 through adhesive layer bonding, and an upper surface of the support plate 212 is fastened to a surface of a side that is of the display module 10 and that is close to the middle frame 11, so that the first magnet 21 is connected to the display module 10 by using the support plate 212.

In this way, when the main magnet 2210 uses the Halbach array, interaction between the magnetic field generated by the main magnet 2210 and the magnetic field generated by the coil 211 can be improved, so that vibration intensity of the main magnet 2210 is improved. In addition, because the first magnetic shield 51 is omitted, thickness space of the actuator 201 can be reduced, so that a thickness of the mobile terminal is reduced.

Certainly, because space for disposing the first magnetic shield 51 is omitted, larger magnet space may be further obtained, for example, sizes or a size of the main magnet 2210 and/or an auxiliary magnet 2211 are or is increased, or a quantity of turns of the coil 211 is increased, so that interaction between the magnetic field generated by the main magnet 2210 and the magnetic field generated by the coil 211 is further improved, and vibration intensity of the main magnet 2210 is improved.

Further, the support plate 212 may be omitted, and the main magnet 2210 may be directly fastened to the display module 10 through adhesive layer bonding, so that the first magnet 21 is connected to the display module 10.

In addition, in some embodiments of this application, positions of the main magnet 2210, the coil 211, the auxiliary magnet 2211, and the second magnetic shield 52 in FIG. 38 may be reversed. To be specific, the first magnet 21 is the coil 211, and the second magnet 22 is the main magnet 2210. In this case, the second magnetic shield 52, the coil 211, and the auxiliary magnet 2211 are fastened to the back facet of the display module 10. Because the first magnetic shield 51 is omitted, the main magnet 2210 passes through a hole on the middle frame 11, and may be directly fastened to an upper surface of a support 223 by using an adhesive layer. A process in which a mobile terminal having this structure implements sound on display is the same as that described above. Details are not described herein again.

Example 8

Figure 39:
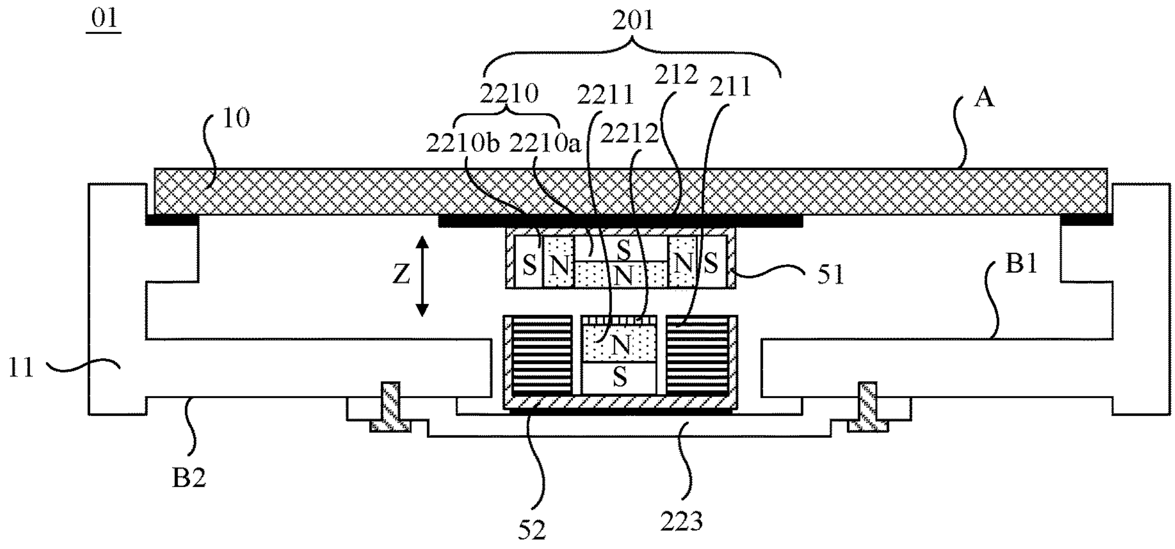
FIG. 39 is a schematic diagram of another structure of the first magnet and the second magnet in the mobile terminal shown in FIG. 5.

In this example, as shown in FIG. 39, the first magnet 21 is a main magnet 2210, and the second magnet 22 is a coil 211.

The main magnet 2210 is located outside a closed region wound by a wire of the coil 211. Opposite surfaces of the main magnet 2210 and the coil 211 are parallel. The coil 211 may be of an annular structure, for example, a circular coil or a square-ring coil. For a specific structure, refer to Example 3.

A difference from Example 6 lies in that, as shown in FIG. 39, the actuator 201 further includes a magnetic conductive plate 2212 located above an auxiliary magnet 2211.

The magnetic conductive plate 2212 is disposed above the auxiliary magnet 2211 and is in contact with the auxiliary magnet 2211. In this case, as shown in FIG. 39, when the auxiliary magnet 2211 is disposed on the middle frame 11 by using a support 223, the magnetic conductive plate 2212 is disposed on a surface of a side that is of the auxiliary magnet 2211 and that is close to the first magnet 21 (the main magnet 2210 shown in FIG. 39) (in other words, away from the middle frame 11).

The magnetic conductive plate 2212 may be directly fastened to the auxiliary magnet 2211 through adhesive layer bonding.

A shape of the magnetic conductive plate 2212 may be a circle, a square, a triangle, a polygon, or another regular or irregular pattern. In some embodiments, the shape of the magnetic conductive plate 2212 may be the same as a cross-sectional pattern of the auxiliary magnet 2211. The magnetic conductive plate 2212 may be sheet-shaped, block-shaped, or cover-shaped. This is not specially limited in this embodiment of this application.

The magnetic conductive plate 2212 is mainly used for magnetic conduction, so that a magnetic force is more centralized, thereby increasing magnetic flux passing through the coil 211 and improving magnetic induction intensity of the coil 211. Therefore, an acting force between the coil 211 and the main magnet 2210 is increased, and vibration intensity of the main magnet 2210 is improved. In an embodiment, referring to FIG. 35 and FIG. 36, after a current is applied to the coil 211, magnetic flux horizontally passing through the coil 211 includes magnetic flux generated by the main magnet 2210, magnetic flux generated by the auxiliary magnet 2211, magnetic flux generated by a first magnetic shield 51 after the first magnetic shield 51 is magnetized, and magnetic flux generated by a second magnetic shield 52 after the second magnetic shield 52 is magnetized. Disposing the magnetic conductive plate 2212 above the auxiliary magnet 2211 can enable magnetic lines of the main magnet 2210, the auxiliary magnet 2211, the first magnetic shield 51, and the second magnetic shield 52 to be smoother, to increase the magnetic flux horizontally passing through the coil 211. In a case of a specified area, because the magnetic flux horizontally passing through the coil 211 is increased, magnetic induction intensity of the coil 211 is improved, and the acting force between the coil 211 and the main magnet 2210 is increased. In this way, vibration intensity of the main magnet 2210 can be improved, so that a larger push force is generated to drive the display module 10 to vibrate, thereby implementing sound on display. In addition, sound generated by the screen can be increased.

In this example, the magnetic conductive plate 2212 may be disposed on a surface of a side that is of the auxiliary magnet 2211 and that is away from the middle frame (in other words, close to the display module 10), or may be disposed on a surface of a side that is of the main magnet 2210 and that is away from the display module 10.

In addition, in some embodiments of this application, the first magnetic shield 51 in FIG. 39 may be alternatively removed. In this case, after the coil 211 is powered on, the magnetic flux horizontally passing through the coil 211 includes the magnetic flux generated by the main magnet 2210, the magnetic flux generated by the auxiliary magnet 2211, and the magnetic flux generated by the second magnetic shield 52 after the second magnetic shield 52 is magnetized.

In addition, in some embodiments of this application, positions of the main magnet 2210, the coil 211, and the auxiliary magnet 2211 in FIG. 39 may be reversed. To be specific, the first magnet 21 is the coil 211, and the second magnet 22 is the main magnet 2210. In this case, the coil 211 and the auxiliary magnet 2211 are fastened to the back facet of the display module 10, and the main magnet 2210 passes through a hole on the middle frame 11, and may be directly fastened to an upper surface of the support 223 by using an adhesive layer. The magnetic conductive plate 2212 is disposed on a surface of a side that is of the main magnet 2210 and that is away from the middle frame 11, or is located on a surface of a side that is of the auxiliary magnet 2211 and that is away from the display module 10.

A process in which a mobile terminal having this structure implements sound on display is the same as that described above. Details are not described herein again.

In Example 6, Example 7, and Example 8, an example in which the main magnet 2210 uses the Halbach array is described. In some embodiments of this application, the auxiliary magnet 2211 may also use the Halbach array. When the auxiliary magnet 2211 uses the Halbach array, an implementation thereof is similar to the main magnet 2210 using the Halbach array. A magnetic field on a side that is of the auxiliary magnet 2211 and that is close to the main magnet 2210 is significantly enhanced, and a magnetic field on a side that is of the auxiliary magnet 2211 and that is close to the middle frame 11 is significantly weakened. For details, refer to the foregoing descriptions. Details are not described herein again. When the auxiliary magnet 2211 further uses the Halbach array, interaction between magnetic fields of the first magnet 21 and the second magnet 22 can be further improved, so that vibration intensity of the main magnet 2210 or vibration intensity of the coil 221 is improved.

Example 9

Figure 40:
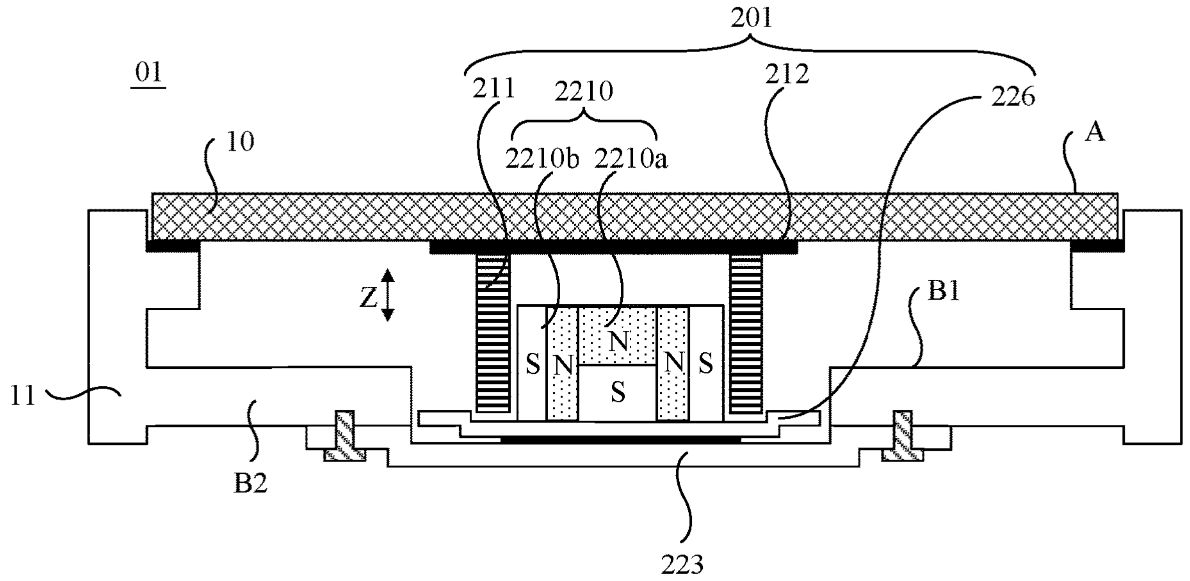
FIG. 40 is a schematic diagram of another structure of the first magnet and the second magnet in the mobile terminal shown in FIG. 5.

In this example, as shown in FIG. 40, the first magnet 21 is a coil 211, and the second magnet 22 is a main magnet 2210.

A part of the main magnet 2210 is embedded in a closed region wound by a wire of the coil 211. The coil 211 may be of an annular structure, for example, a circular coil or a square-ring coil. For a specific structure, refer to Example 3.

A difference from the mobile terminal shown in FIG. 6 in Example 1 lies in that, as shown in FIG. 40, the main magnet 2210 uses a Halbach array. To support the main magnet 2210, the actuator 201 further includes a magnetic bowl 226. An upper surface of the magnetic bowl 226 is fastened to a lower surface of the main magnet 2210 by using an adhesive layer, and a lower surface of the magnetic bowl 226 passes through a hole on the middle frame 11, and is fastened to an upper surface of a support 223 by using an adhesive layer.

The magnetic bowl 226 may be made of stainless steel. In this case, the magnetic bowl 226 may have a magnetic shielding function, to reduce a probability that magnetic fields generated by the main magnet 2210 and the coil 211 adversely affect another component in the mobile terminal 01. In this example, the main magnet 2210 uses the Halbach array, and magnetic field strength on a side that is of the main magnet 2210 and that is close to the support 223 is quite weak. Therefore, the magnetic bowl 226 may be thinner than a magnetic bowl 226 when the main magnet 2210 uses a single magnet, provided that the magnetic field generated by the coil 211 is shielded.

In this example, the main magnet 2210 includes a first main magnet part 2210*a* and a second main magnet part 2210*b*. An end that is of the first main magnet part 2210*a* and that is close to the display module 10 is set to an N pole, and an end that is of the first main magnet part 2210*a* and that is away from the display module 10 (in other words, close to the support 223) is set to an S pole. An end that is of the second main magnet part 2210*b* and that is close to the first main magnet part 2210*a* is set to an N pole, and an end that is of the second main magnet part 2210*b* and that is away from the first main magnet part 2210*a* (in other words, close to the coil 211) is set to an S pole.

In other words, a disposing manner of the main magnet 2210 in this embodiment of this application is equivalent to flipping the Halbach array shown in FIG. 31 in Example 6 up and down and disposing the Halbach array on the upper surface of the magnetic bowl 226, so that a magnetic field formed by the Halbach array shown in FIG. 31 is significantly enhanced on a side close to the display module 10, and is significantly weakened on a side close to the support 223.

When the coil 211 receives the foregoing first drive signal (that is, an intermediate-frequency or high-frequency signal), the coil 211 generates an alternating magnetic field under action of the first drive signal. Strength and a direction of the magnetic field generated by the coil 211 change with the first drive signal. The main magnet 2210 uses the Halbach array to generate a constant magnetic field with constant strength and a constant direction. Therefore, under interaction of the two magnetic fields, the coil 211 can vibrate up and down in a magnetic line cutting manner at a small amplitude and a high frequency in the foregoing Z direction. Further, the display module 10 can be driven to vibrate up and down at a small amplitude and a high frequency in the same direction, and as a diaphragm, the display module 10 pushes air to generate sound.

In an embodiment of this application, the main magnet 2210 uses the Halbach array, so that magnetic field strength on a side that is of the main magnet 2210 and that is close to the coil 211 is significantly improved. In this way, when the magnetic field generated by the coil 211 interacts with the magnetic field generated by the main magnet 2210 after the coil 211 is powered on, magnetic forces exerted on the main magnet 2210 and the coil 211 are significantly increased, so that vibration intensity of the coil 211 can be improved.

In addition, while same performance in Example 1 is achieved (for example, the coil 211 has same vibration intensity), the main magnet 2210 may be thinner, or a quantity of turns of the coil 211 may be smaller, or the magnetic bowl 226 may be thinner, so that thickness space of the actuator 201 can be reduced, thereby reducing a thickness of the mobile terminal.

In an embodiment, based on the mobile terminal shown in this example, a magnetic conductive plate 2212 shown in Example 8 may also be disposed above the main magnet 2210, and the magnetic conductive plate 2212 is located on a surface of a side that is of the main magnet 2210 and that is away from the middle frame 11 (in other words, away from the support 223). With the foregoing function, the magnetic conductive plate 2212 can increase an acting force between the coil 211 and the main magnet 2210, to improve vibration intensity of the coil 211.

In addition, in some embodiments of this application, setting of magnetic poles of the main magnet 2210 in FIG. 40 may be completely reversed. In this case, the main magnet 2210 is still a Halbach array, magnetic field strength on a side that is of the Halbach array and that is close to the coil 211 is significantly improved, and magnetic field strength on a side that is of the Halbach array and that is close to the display module 10 is significantly reduced. A process in which a mobile terminal having this structure implements sound on display is the same as that described above. Details are not described herein again.

In addition, in some embodiments of this application, positions of the main magnet 2210 and the coil 211 in FIG. 40 may be reversed. To be specific, the first magnet 21 is the main magnet 2210, and the second magnet 22 is the coil 211. In this case, the main magnet 2210 is fastened to the back facet of the display module 10, and the coil 211 passes through the hole on the middle frame 11, and is fastened to the upper surface of the support 223. In this case, the main magnet 2210 uses the Halbach array to generate a strong magnetic field on a side close to the middle frame 11, to improve vibration intensity of the main magnet 2210. In this case, the magnetic conductive plate 2212 is located on a surface of a side that is of the main magnet 2212 and that is away from the display module 10. A process in which a mobile terminal having this structure implements sound on display is the same as that described above. Details are not described herein again.

Example 10

Figure 41:
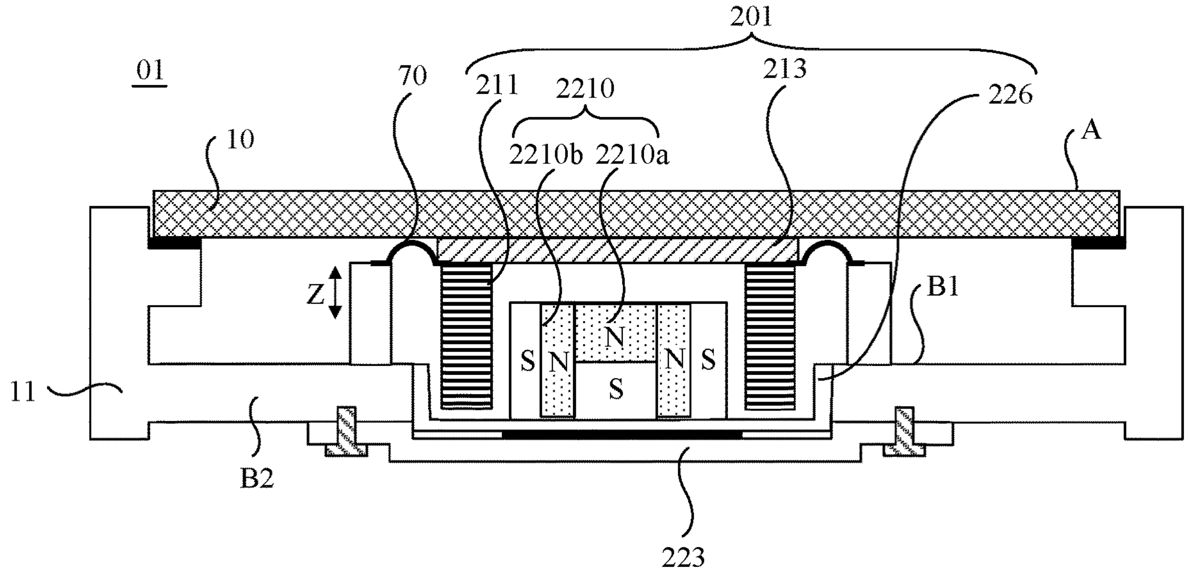
FIG. 41 is a schematic diagram of another structure of the first magnet and the second magnet in the mobile terminal shown in FIG. 5.

In this example, as shown in FIG. 41, the first magnet 21 is a coil 211, and the second magnet 22 is a main magnet 2210.

A part of the main magnet 2210 is embedded in a closed region wound by a wire of the coil 211. The coil 211 may be of an annular structure, for example, a circular coil or a square-ring coil.

The main magnet 2210 may be connected to the middle frame 11 by using a support 223. For a specific implementation, refer to the related descriptions in the foregoing examples. Details are not described herein again.

A difference from Example 10 lies in the following: A shape of a magnetic bowl 226 in Example 10 may be shown in FIG. 40, an edge of the magnetic bowl 226 extends in a direction parallel to the bottom of the magnetic bowl 226, and a height of the magnetic bowl 226 is small. In this example, a shape of a magnetic bowl 226 is shown in FIG. 41, an edge of the magnetic bowl 226 extends in a direction perpendicular to the bottom of the magnetic bowl 226, a height of the magnetic bowl 226 is large, and magnetic shielding space may be formed between a bottom wall and the edge of the magnetic bowl 226. In this case, the magnetic bowl 226 may enclose a part of the coil 221 and the main magnet 2210 in the magnetic shielding space. The part that is of the coil 211 and that is enclosed by the edge of the magnetic bowl 226 is embedded in a gap between the edge of the magnetic bowl 226 and the main magnet 2210.

Unlike the foregoing examples, in this example, the mobile terminal includes a dome 213 and a diaphragm ring 70. The dome 213 is fastened to a surface of a side that is of the display module 10 and that is close to the middle frame 11. An upper surface of the dome 213 is connected to the display module 10, and a lower surface of the dome 213 is connected to the coil 211.

The dome 213 is fastened to the display module 10, and is configured to drive the display module 10 to vibrate and generate sound. The diaphragm ring 70 is configured to ensure that the dome 213 moves along a Z direction and prevent the dome 213 from moving in a direction perpendicular to the Z direction.

When the coil 211 receives the foregoing first drive signal (that is, an intermediate-frequency or high-frequency signal), the coil 211 generates an alternating magnetic field under action of the first drive signal. Strength and a direction of the magnetic field generated by the coil 211 change with the first drive signal. The main magnet 2210 uses the Halbach array to generate a constant magnetic field with constant strength and a constant direction. Therefore, under interaction of the two magnetic fields, the coil 211 can vibrate up and down in a magnetic line cutting manner at a small amplitude and a high frequency along the Z direction. The dome 213 is connected to the coil 211. Therefore, the coil 211 drives the dome to vibrate up and down at a small amplitude and a high frequency along the Z direction, and the diaphragm ring 70 also prevents the dome 213 from moving in the direction perpendicular to the Z direction.

Further, the dome 213 may drive the display module 10 to vibrate at a small amplitude and a high frequency in the same direction, and as a diaphragm, the display module 10 pushes air to generate sound.

In this embodiment of this application, the main magnet 2210 uses the Halbach array, so that magnetic field strength on a side that is of the main magnet 2210 and that is close to coil 211 is significantly improved. In this way, when the magnetic field generated by the coil 211 interacts with the magnetic field generated by the main magnet 2210 after the coil 211 is powered on, magnetic forces exerted on the main magnet 2210 and the coil 211 are significantly increased, so that vibration intensity of the coil 211 can be improved, a push force exerted on the screen by the dome 213 can be optimized, and a sound on display effect can be improved. Optionally, in the embodiments in Example 1 to Example 5 (in the mobile terminals shown in FIG. 21 to FIG. 27), all the main magnets 2210 may use the Halbach arrays in Example 6 to Example 10. A specific implementation thereof and a process of implementing sound on display by the mobile terminal having the Halbach array are described above. Details are not described herein again.

The actuator 201 provided in the embodiments of this application includes the first magnet 21 and the second magnet 22. The first magnet 21 is disposed on the back facet of the display module 10, the second magnet 22 is disposed on the middle frame 11, and positions of the first magnet 21 and the second magnet 22 are disposed opposite to each other. This structure makes stacking easier when the actuator 201 is applied to the mobile terminal, to implement sound on display when layout space of the mobile terminal is insufficient.

It should be noted that the Halbach array can enhance a unilateral magnetic field and weaken a magnetic field on the other side. During application, a combination relationship between magnets in the Halbach array, sizes of the magnets, and a combination thereof may be correspondingly designed based on constraints such as an actual magnetic field requirement and mounting space of a mobile terminal.

In the descriptions of this application, it should be noted that terms “mount” “joint”, and “connection” should be understood in a broad sense unless there is a clear stipulation and limitation. For example, “connection” may be a fixed connection, a detachable connection, or an integrated connection; may be a mechanical connection or an electrical connection; and may be a direct connection, an indirect connection through an intermediate medium, or a connection inside two elements. A person of ordinary skill in the art may understand specific meanings of the foregoing terms in this application based on a specific situation.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A mobile terminal, comprising:

a middle frame and a housing;

a display module disposed on the middle frame, wherein an accommodating space is formed between the display module and the middle frame; and a first magnet and a second magnet, wherein at least a part of the first magnet and at least a part of the second magnet are disposed in the accommodating space; and the first magnet is disposed on a back facet of the display module, the second magnet is disposed on the middle frame, and positions of the first magnet and the second magnet are disposed opposite to each other, wherein the first magnet is a coil, and the second magnet is a main magnet; or the first magnet is a main magnet, and the second magnet is a coil; and the main magnet is a Halbach array to generate a unilateral magnetic field on a side opposite to the coil.

2. The mobile terminal according to claim 1, wherein a part of the main magnet is embedded in a closed region wound by a wire of the coil.

3. The mobile terminal according to claim 2, further comprising:

an auxiliary magnet located on a same side as of the main magnet;

a gap formed between the auxiliary magnet and the main magnet, wherein a part of the coil is located in the gap between the auxiliary magnet and the main magnet.

4. The mobile terminal according to claim 2, further comprising a washer, wherein when the first magnet is the main magnet, the washer is located on a surface of a side of the main magnet that is away from the display module; or when the second magnet is the main magnet, the washer is located on a surface of a side of the main magnet that is away from the middle frame.

5. The mobile terminal according to claim 2, further comprising a magnetic bowl to carry the main magnet, wherein when the second magnet is the main magnet, the magnetic bowl is located on a surface of a side of the main magnet that is away from the display module.

6. The mobile terminal according to claim 1, wherein the main magnet is located outside a closed region wound by a wire of the coil; and opposite surfaces of the main magnet and the coil are parallel.

7. The mobile terminal according to claim 6, further comprising:

an auxiliary magnet located on a same side as of the coil, wherein the auxiliary magnet is embedded in the closed region wound by the wire of the coil.

8. The mobile terminal according to claim 7, wherein opposite sides of the auxiliary magnet and the main magnet are a same magnetic pole.

9. The mobile terminal according to claim 6, further comprising a magnetic conductive plate, wherein when the first magnet is the main magnet, the magnetic conductive plate is located on a surface of a side of the main magnet that is away from the display module, or the magnetic conductive plate is located on a surface of a side of the auxiliary magnet that is away from the middle frame; or when the second magnet is the main magnet, the magnetic conductive plate is located on a surface of a side of the main magnet that is away from the middle frame, or the magnetic conductive plate is located on a surface of a side of the auxiliary magnet that is away from the display module.

10. The mobile terminal according to claim 6, further comprising a coil magnetic shield, wherein all surfaces other than at least a surface of a side of the coil facing the main magnet are wrapped by the coil magnetic shield.

11. The mobile terminal according to claim 10, further comprising a first magnetic shield, wherein all surfaces other than a surface of a side of the main magnet facing the coil are wrapped by the first magnetic shield.

12. The mobile terminal according to claim 1, wherein the main magnet comprises a first main magnet part and a second main magnet part that is annular and nested on the first main magnet part, wherein a magnetic pole direction of the second main magnet part is perpendicular to a magnetic pole direction of the first main magnet part.

13. The mobile terminal according to claim 1, further comprising:

a support disposed on a surface of a side of the middle frame that is away from the display module;

a hole disposed on the middle frame, wherein at least a part of the second magnet is located in the hole on the middle frame, and the second magnet passes through the hole on the middle frame and is disposed on the support.

14. The mobile terminal according to claim 13, further comprising a spring plate and a support block located in the hole on the middle frame, wherein the spring plate is located between the second magnet and the support, and the spring plate is connected to the second magnet; and the support block is disposed between the spring plate and the support, and an upper surface and a lower surface of the support block are respectively connected to the spring plate and the support.

15. The mobile terminal according to claim 1, further comprising a spring plate and a support block, wherein the spring plate, the support block, the first magnet, and the second magnet are all located in the accommodating space;

the spring plate is located between the second magnet and the middle frame, and the spring plate is connected to the second magnet; and the support block is disposed between the spring plate and the middle frame, and an upper surface and a lower surface of the support block are respectively connected to the spring plate and the middle frame.

16. The mobile terminal according to claim 1, further comprising a support plate including an upper surface connected to the display module; and a lower surface connected to the first magnet, wherein an area of the upper surface of the support plate is larger than an area of a surface of a side of the first magnet that is close to the support plate.

* * * * *